Jan. 10, 1956          E. HAJOS          2,730,303
WEIGHING MACHINE PRINTER
Filed Aug. 18, 1950          13 Sheets-Sheet 2
FIG. IA
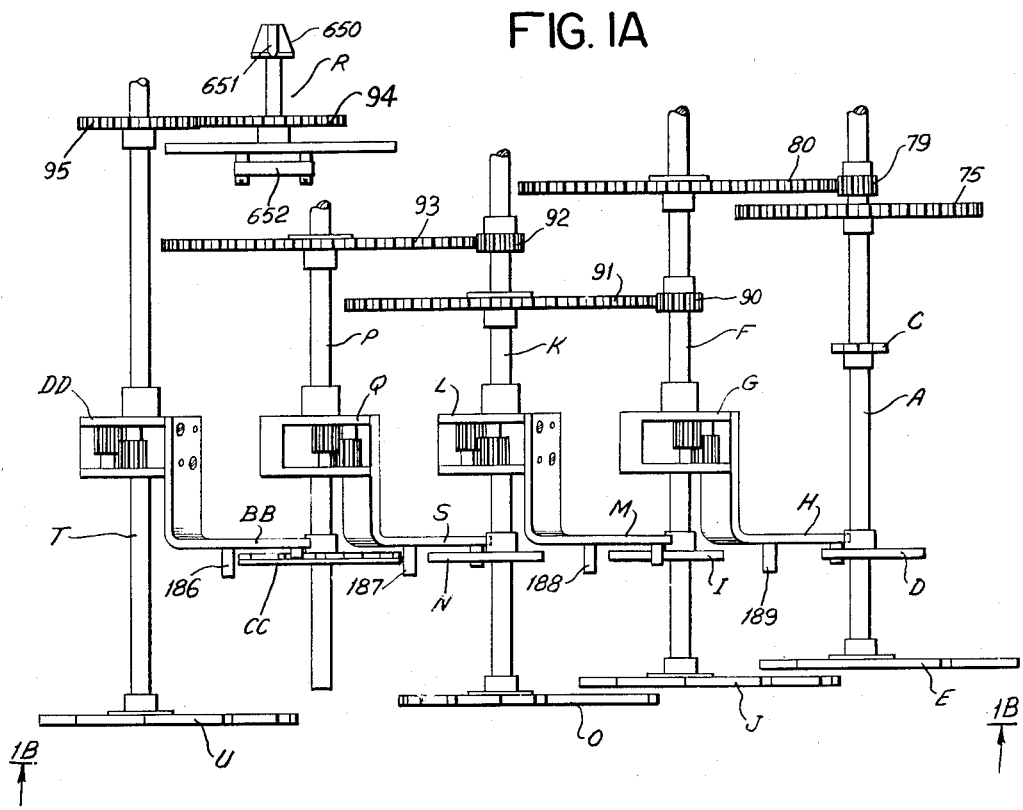
FIG. IB
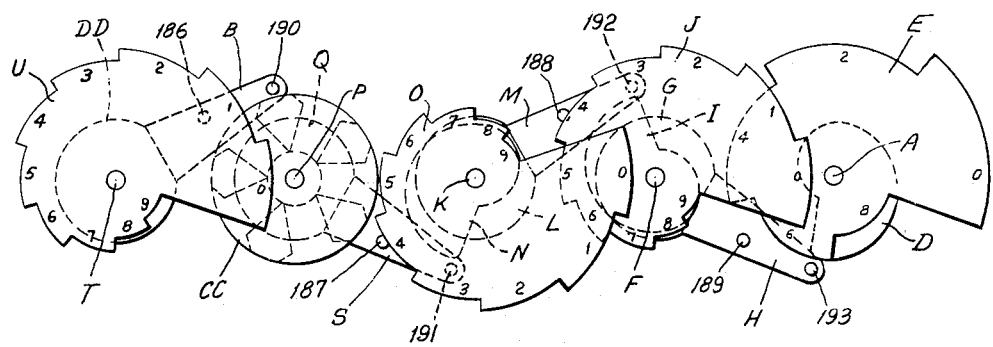
INVENTOR.
EUGENE HAJOS
BY 
ATTORNEY

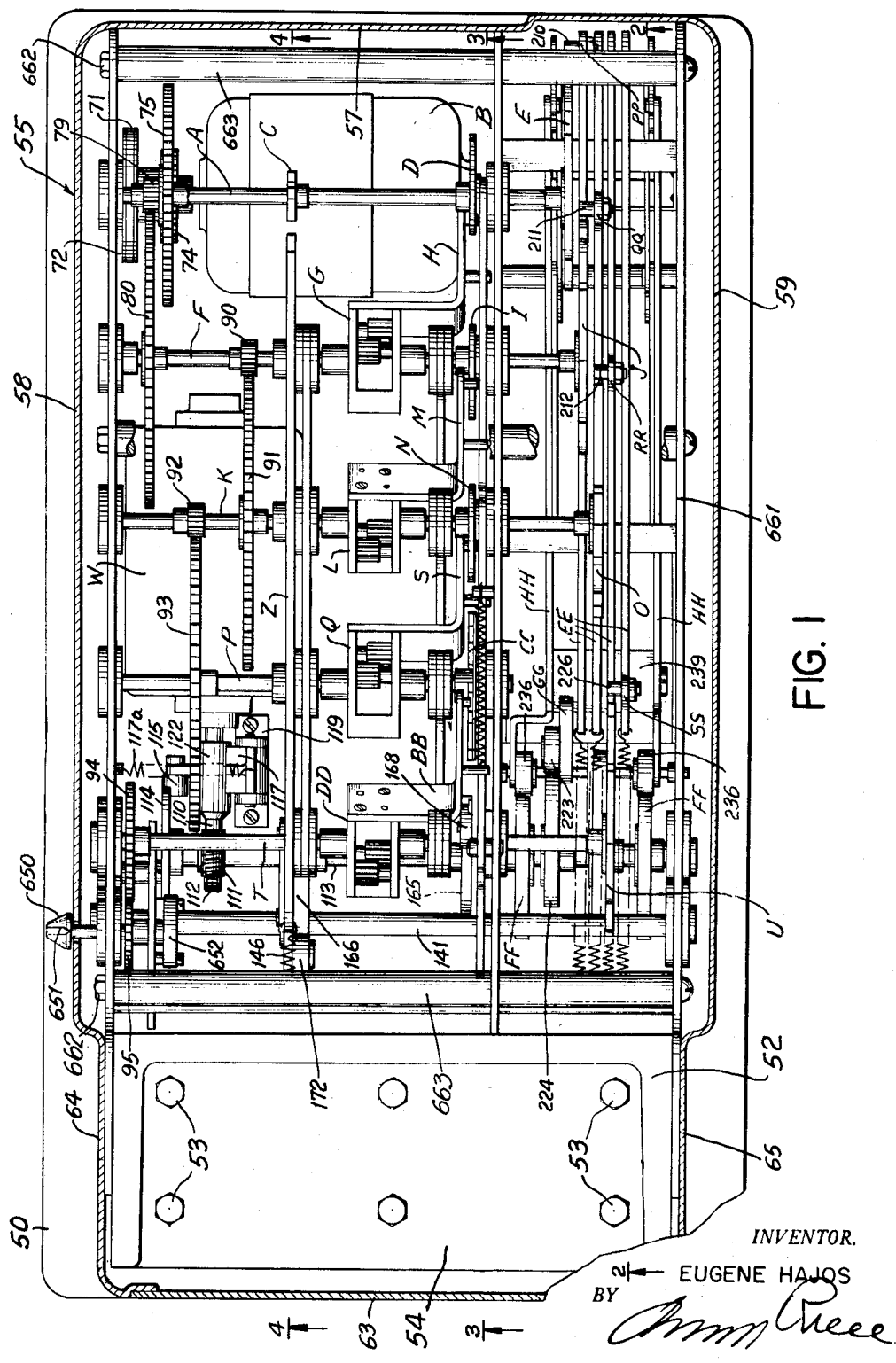

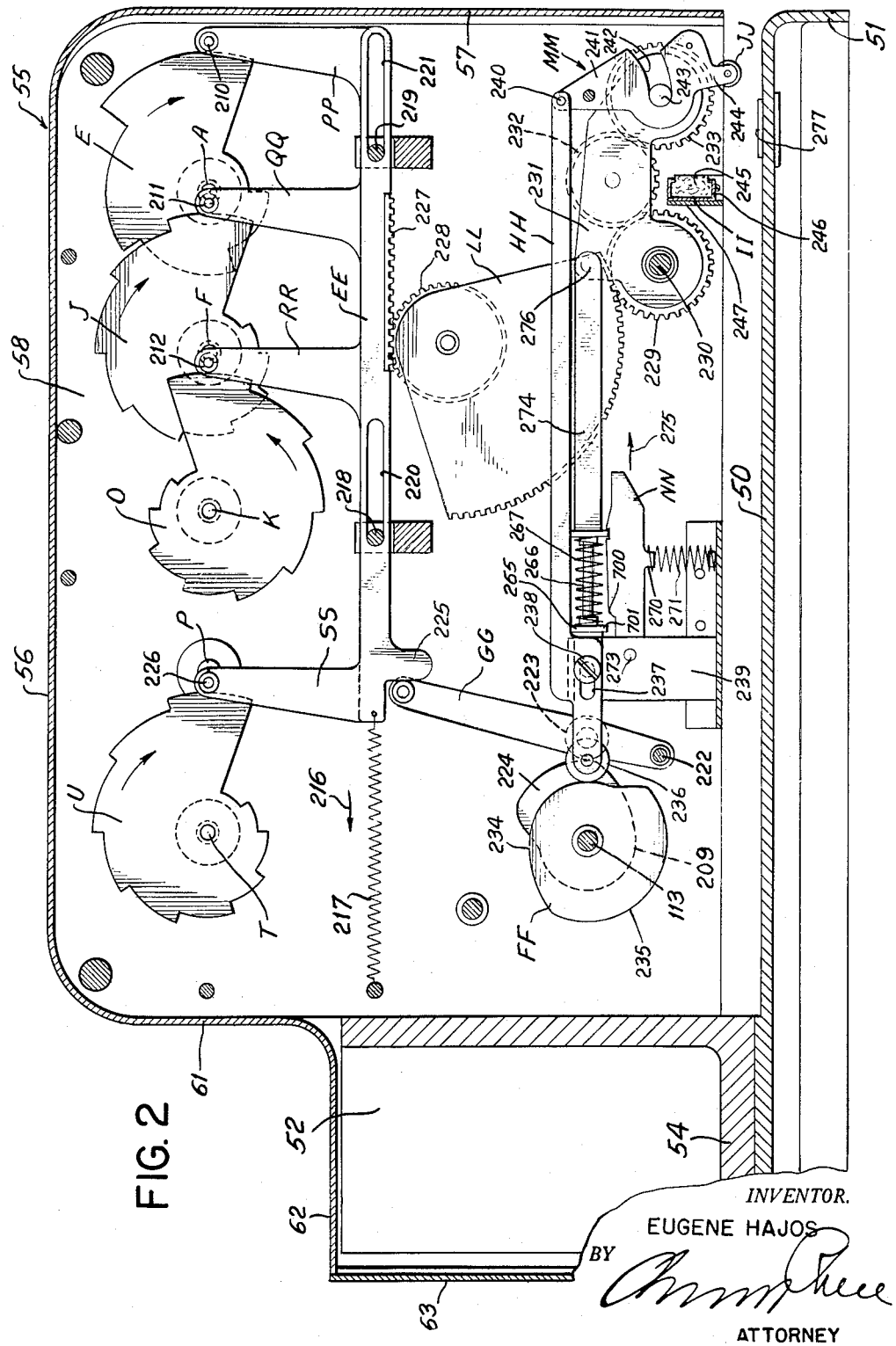

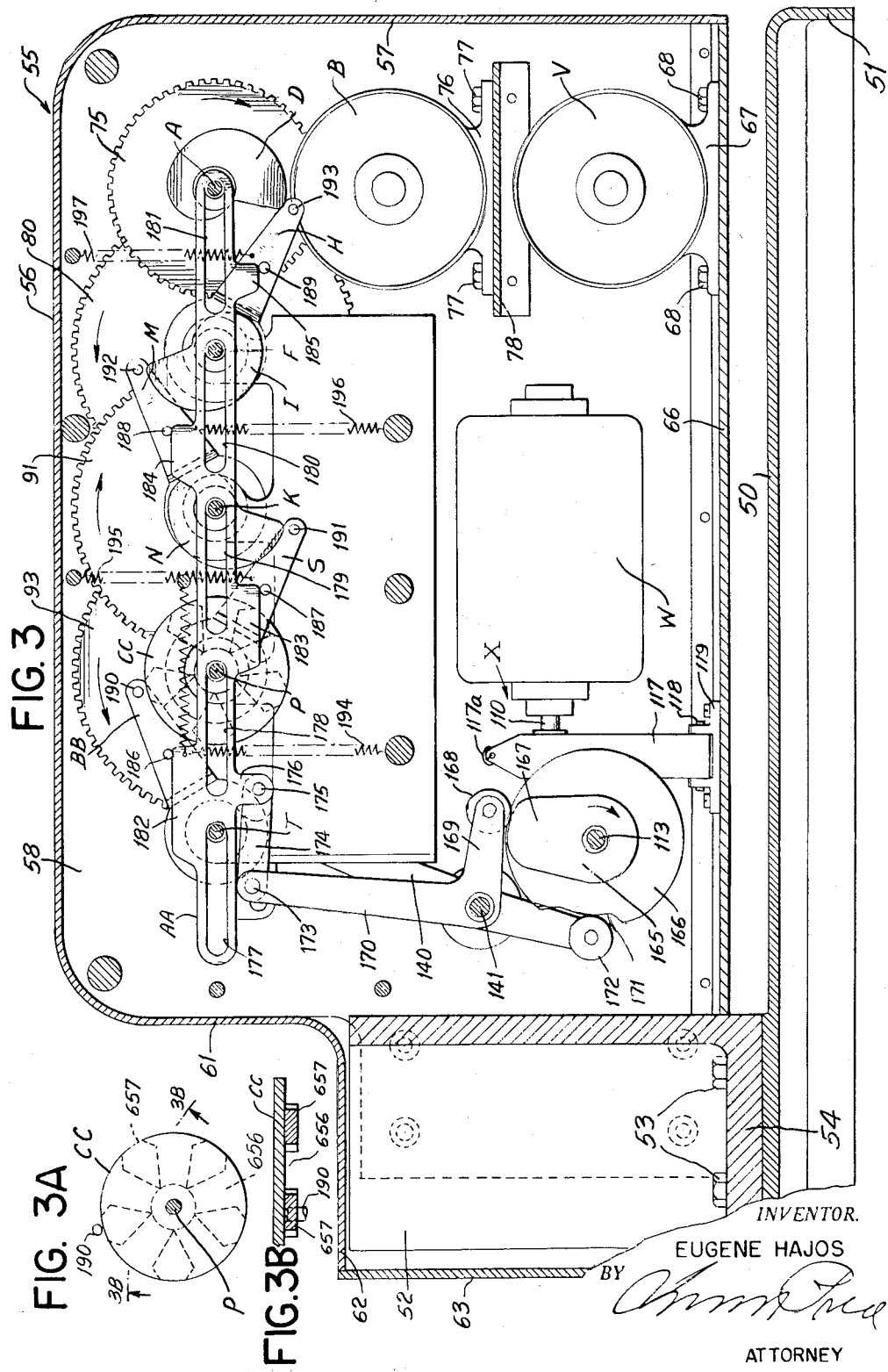

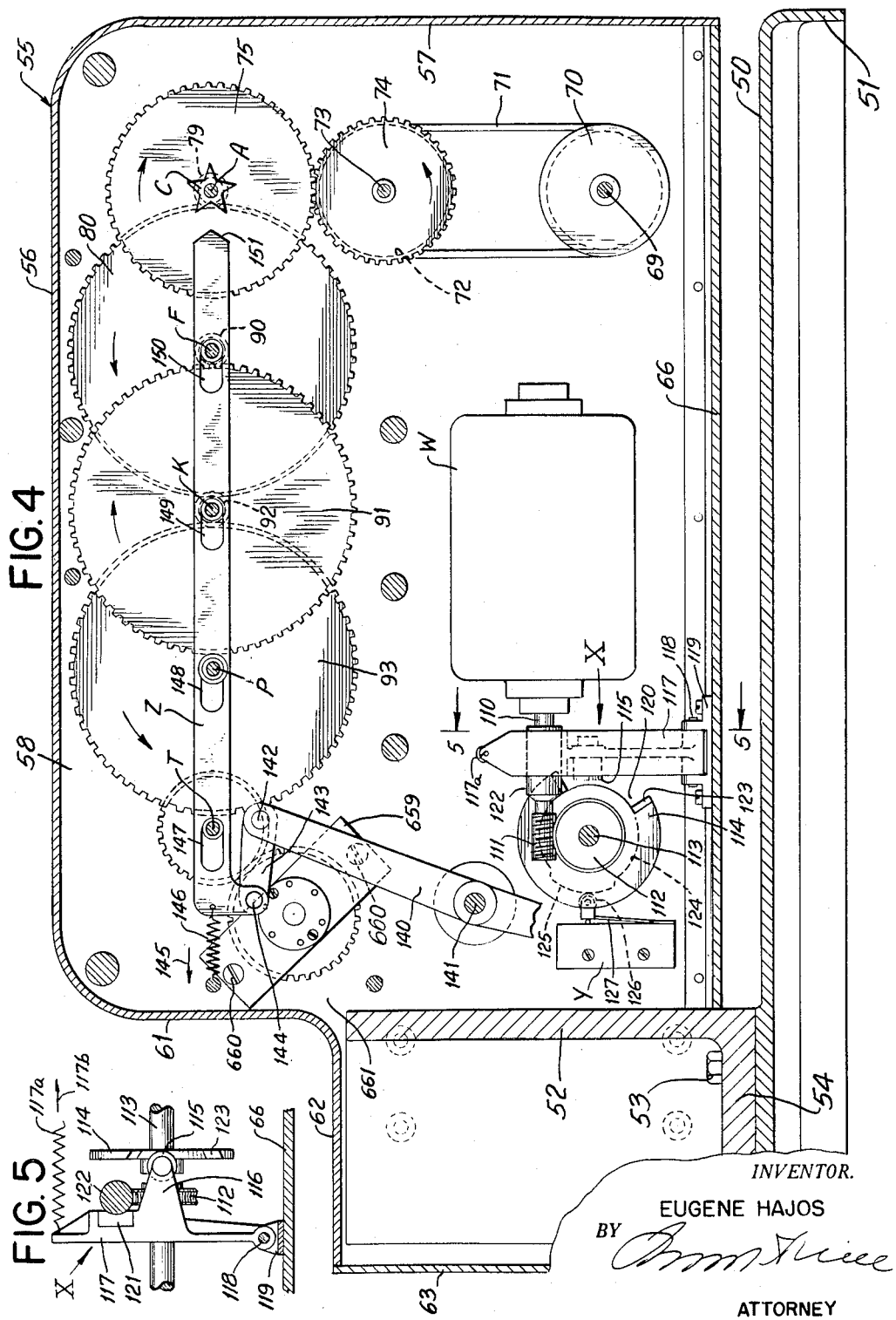

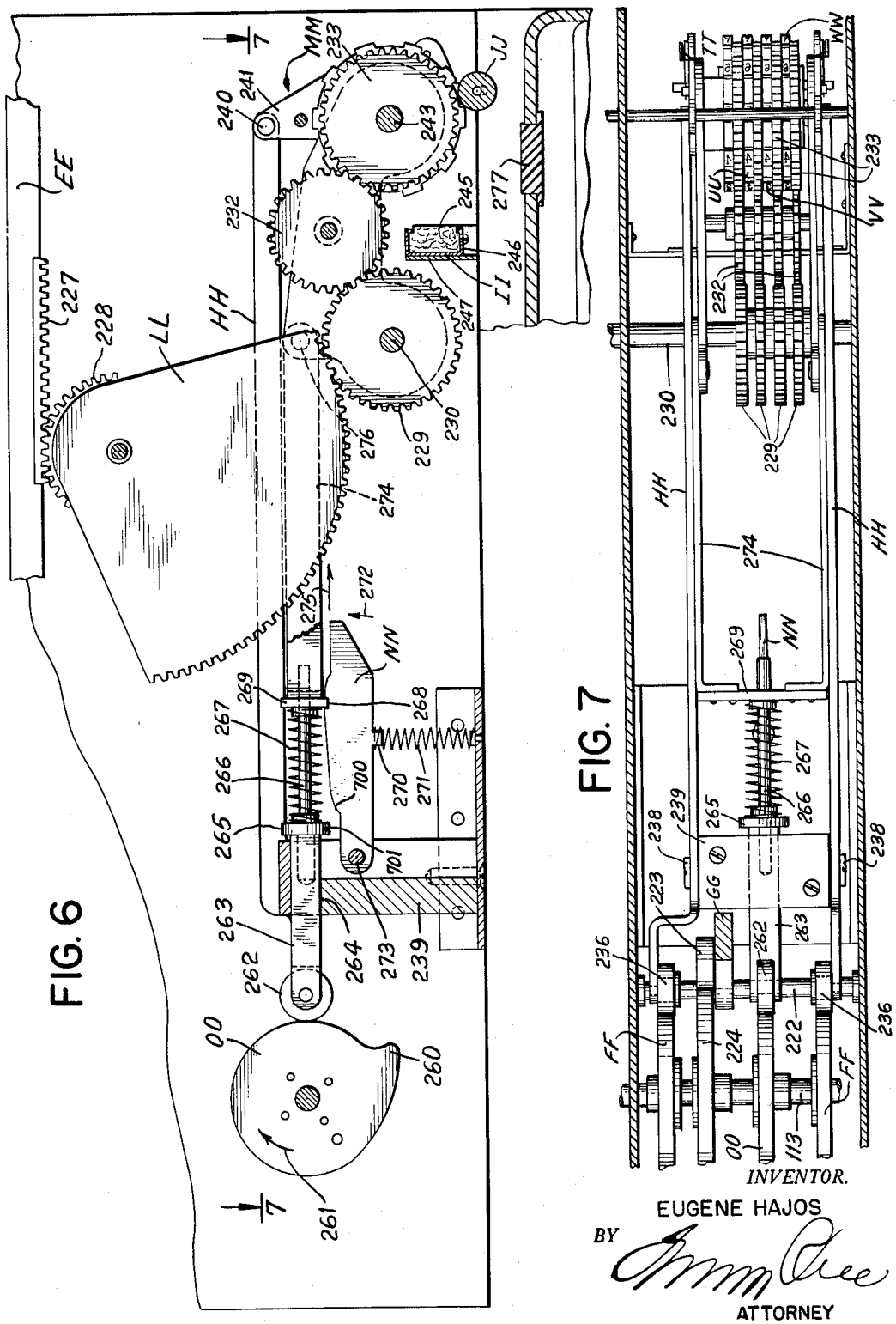

Jan. 10, 1956  E. HAJOS  2,730,303
WEIGHING MACHINE PRINTER
Filed Aug. 18, 1950  13 Sheets-Sheet 7

INVENTOR.
EUGENE HAJOS
BY
ATTORNEY.

Jan. 10, 1956  E. HAJOS  2,730,303
WEIGHING MACHINE PRINTER
Filed Aug. 18, 1950  13 Sheets-Sheet 8
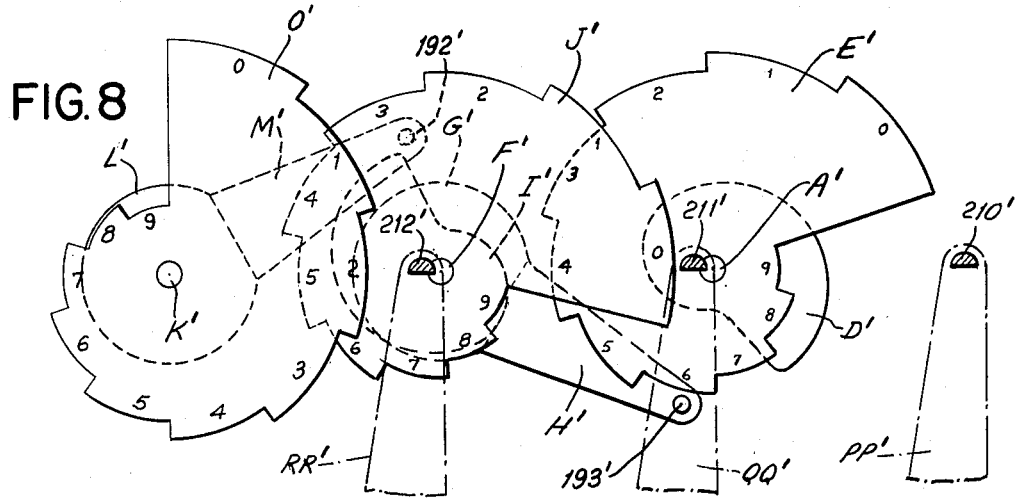
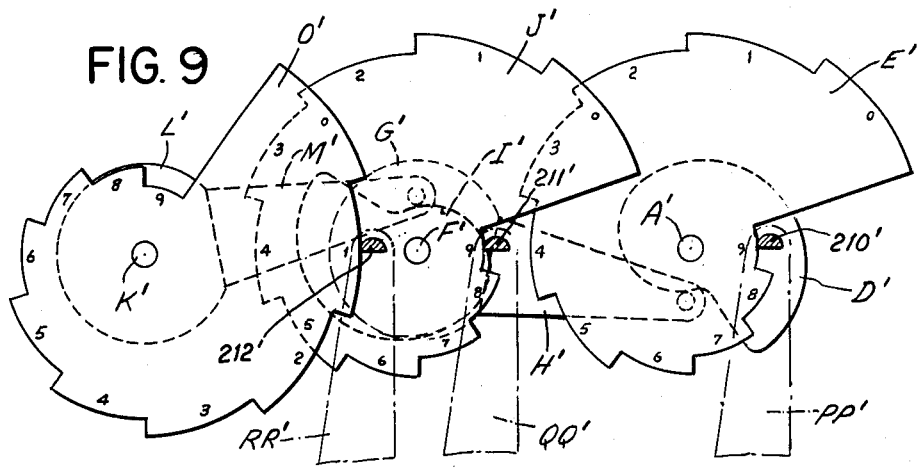
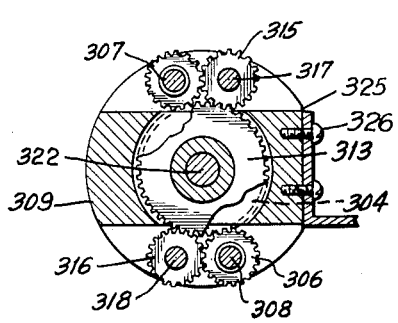
INVENTOR.
EUGENE HAJOS
BY
ATTORNEY Jan. 10, 1956     E. HAJOS     2,730,303
WEIGHING MACHINE PRINTER
Filed Aug. 18, 1950     13 Sheets-Sheet 9
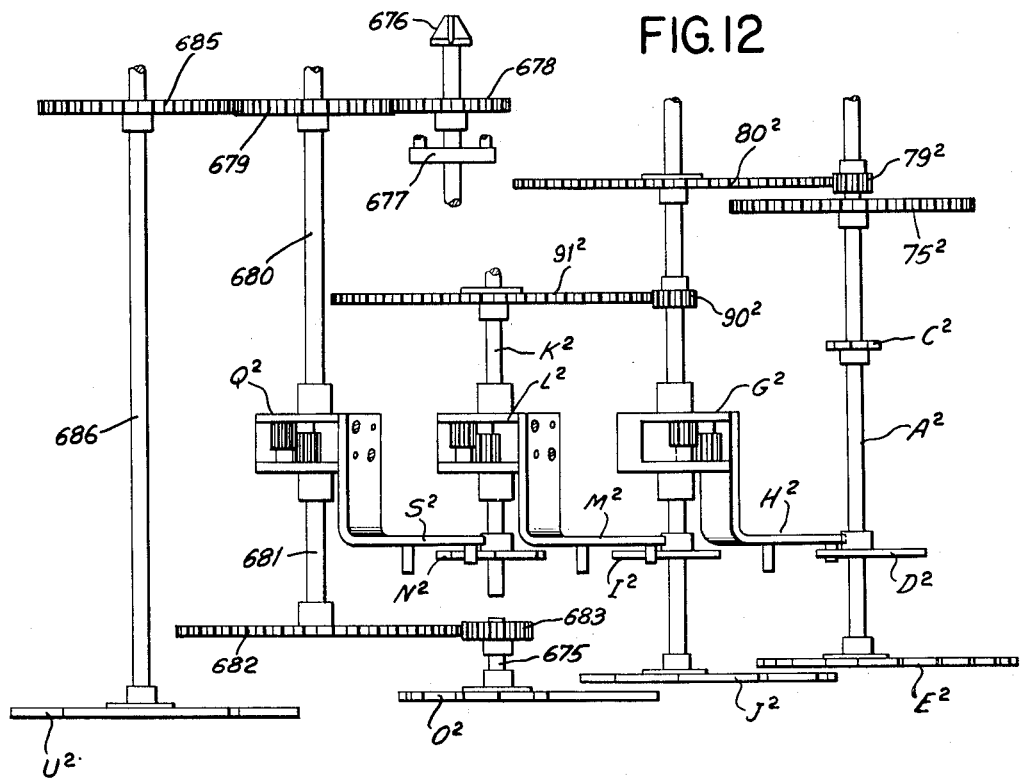
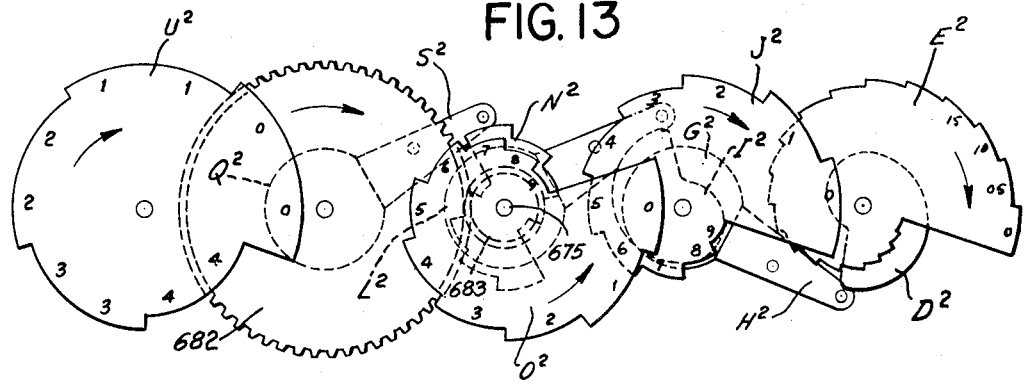
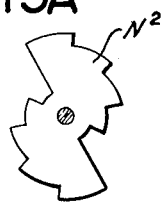
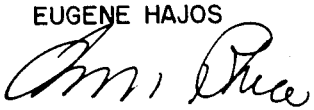
INVENTOR.
EUGENE HAJOS
BY
ATTORNEY Jan. 10, 1956   E. HAJOS   2,730,303
WEIGHING MACHINE PRINTER
Filed Aug. 18, 1950   13 Sheets-Sheet 11

INVENTOR.
EUGENE HAJOS
BY
ATTORNEY

Jan. 10, 1956     E. HAJOS     2,730,303
WEIGHING MACHINE PRINTER

Filed Aug. 18, 1950     13 Sheets-Sheet 12

INVENTOR.
EUGENE HAJOS
BY
ATTORNEY

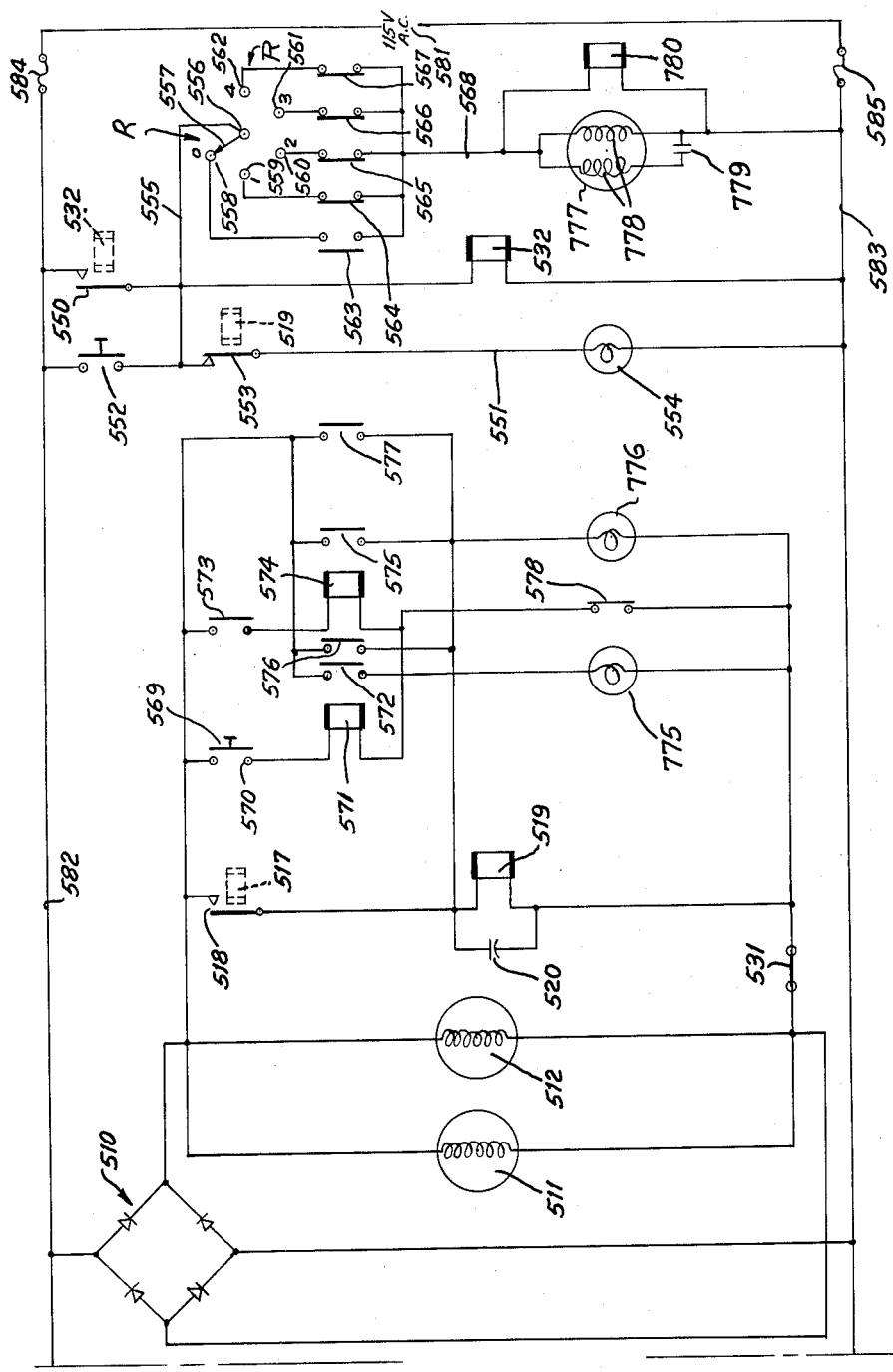

2,730,303
WEIGHING MACHINE PRINTER

Eugene Hajos, Rutland, Vt., assignor, by mesne assignments, to The Howe Scale Company, Inc., Rutland, Vt., a corporation of Delaware Application August 18, 1950, Serial No. 180,180

21 Claims. (Cl. 235—136)

The present invention relates to a recording mechanism and it particularly relates to a printing mechanism.

Although not specifically limited thereto, the present invention will be particularly described in its application to a remotely controlled printer mechanism for a weighing machine or device.

In connection with the weighing machines, it is frequently desirable to make a large number of weighings at short intervals of articles of different weights and to indicate and/or record the weights at a desired station which may be remote from the scale.

In ordinary Veeder-Root type recording and indicating mechanisms, the intermittent slow speed transfer necessary to enable the transference from one row of digits to the other requires intermittent gears, which only can be operated at low speeds.

For example, the transfer mechanism from the units to the tens, from the tens to the hundreds, and from the hundreds to the thousands, occurs only as the preceding digit moves from nine to zero.

This necessarily restricts the recorder, indicator or other mechanism associated therewith to a relatively low speed so that only about several thousand counts may be effected per minute. A higher speed than this would cause breakage of the recording machine and would result in an uneconomical construction.

Because of the slowness of operation of these machines, it is not readily possible to connect them directly or indirectly with machines, such as weighing machines, strain gages, potentiometers, calculators, testing machines or other machines where the load is applied in a rapid fashion to cause a sudden translation to the recording or indicating mechanism, nor is it readily possible to provide a mechanism which would save up the effect of the sudden application of the load or stress and then instantaneously apply it for the first time to the indicator or recording mechanism.

In recording and printer mechanisms, which are to be associated with weighing machines, for example, it is necessary to have a recording and printing mechanism which will promptly respond to the movement of the scale mechanism and without substantially delay or retarding action to be ready to give a recording.

It is therefore among the principal objects of the present invention to provide a recording or printing mechanism of the character above described, particularly adapted for weighing machines, but also having a broad application to other types of machines, such as, testing machines, strain gages, calculators, and so forth, where there is a sudden application of a force or stress which is to be measured and the effect of which is substantially instantaneously to be translated to said mechanism.

Another object is to provide a printer or recording mechanism designed to print integers or numbers, which mechanism may be positioned near or remotely from a weighing machine or other testing, weighing or calculating device; and which will promptly respond without delay and without use of intermittent gearing, to permit translation of the count of such weighing machine or other device at relatively high speeds in the order of many thousand counts per minute and which may then be quickly and rapidly adjusted by automatic action to give a correct, accurate and substantially instantaneous printing or recording of the weight, pressure, stress or other indication.

A further object of the present invention is to provide a novel printer mechanism which may be directly driven without use of intermittent gears to print a number of digits; and which after translation may be promptly adjusted to the nearest integer to print the desired recording.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, a printer or recorder is provided with a gearing arrangement in which the digital wheels are directly connected to one another by gearing in proper ratio, the digital wheels corresponding respectively to units, tens, hundreds and sometimes thousands.

In obtaining a recording, the weighing machine is provided with a follow up mechanism, the latter making no physical contact with the delicate scale mechanism. The follow up mechanism is a motor driven device for following the pointer indication without direct connection thereto.

The follow up mechanism may be directly connected to the printer mechanism by gearing or remotely through a servo-mechanism.

The servo-mechanism in the preferred form is a motor-Selsyn combination actuated by a servo-amplifier. The amplifier picks up the error signal between the scale pointer and follow up device occasioned by lack of correspondence between scale pointer and follow up device and by amplifier action operates both follow up mechanism and remote printer in synchronism until correspondence between scale pointer and remote printer is obtained.

In one form of the invention relays are employed to initiate action of the follow up mechanism and remote printer. In this form considerable hunting results. In the preferred form thyratron tubes are employed for control of motors with resultant minimizing of the hunting since the thyratron acts much more quickly than relays.

In the present invention units, tens, hundreds and thousands digit wheels are interconnected by straight 10 to 1 gearing.

In view of the fact it becomes necessary after translation has ceased rapidly to adjust the mechanism so that whole numbers are printed and a particular feature of the present invention resides in the mechanism provided to achieve such adjustment.

The gearing arrangements will cause a proportional rotation of each successive row of digits in the units, tens, hundreds and thousands columns in contrast to transfer arrangements used in the Veeder-Root type of counter in which the transfer takes place in sudden shocks during the movement from nine to zero.

In the present invention, after the translation has taken place the mechanism is readjusted so that the whole numbers or integers will appear, corresponding to the units which have been placed in proper position for recording or printing.

It has been found most suitable to translate the recording from the weighing scale, testing machine, calculator, and the like, directly into a shaft or the printer mechanism and drive the units shaft either directly or remotely by direct current motor coupled with a Selsyn motor to maintain synchronism.

The units shaft, 10's shaft, the 100's shaft and the 1,000's shaft will also be driven directly successively from one another by 10 to 1 gearing connections.

Because of this arrangement the 10's, 100's and 1,000's shafts will be subject to some over-drive since they will be driven proportionately to the amount of rotation of the unit shaft even though normally they should not rotate until the units shaft is about to move from 9 to zero or the preceding shaft, as the case may be, is about to move from 9 to zero.

Due to the direct gearing between the units, 10's, 100's and 1,000's shafts, a very high rotational speed is possible—much higher than with the Veeder-Root type of counter.

Instead of gears, a chain drive, belts, and any other fixed ratio drive arrangement may be employed.

To correct the over-drive as soon as the translation has stopped, the units, 10's, 100's and 1,000's shafts will be automatically readjusted and the amount of over-drive corrected. For example, by means of a differential gearing arrangement operated by an arm which will contact a vernier cam on each preceding shaft, it is possible successively and substantially immediately before printing to correct the setting of each of the digit shafts.

This will cause printer wheels, cooperating with each of said cams to print said count, to rotate into a position to print said count in integers.

In the preferred form of the invention, to which this invention is by no means restricted, the units shaft is provided with a star wheel which enables an accurate setting thereof and each of the successive 10's, 100's and 1,000's shafts are provided with vernier cams which cooperate with levers connected to and serving to operate the next successive digit shaft. These levers operate through a differential gearing connection directly upon the shaft independent of the 10 to 1 direct drive gearing train, which operates only during translation.

If there is to be no printing, after setting by the vernier cams, a reading may be taken directly from the recording or indicating wheels operated by said digit shafts.

On the other hand, if printing is to be accomplished, the printer wheels or type wheels may then be set by levers or by other wheels from step cams or step wheels, one being provided for each of the above-mentioned digit shafts, namely the units shaft, the 10's shaft and the 100's shaft.

It is also possible to readily provide, in connection with a weighing mechanism, a unit weight switch which will automatically add and subtract unit weights to change the scale or the tare mechanism in the weighing machine and arrange a different range of weighing to be employed.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawing wherein like reference characters denote corresponding parts throughout the several views:

Fig. 1 is a top horizontal sectional view of the printer arrangement constituting the preferred embodiment of the present invention, showing a 2000 x 2 arrangement.

Fig. 1A is a diagrammatic top plan view showing the arrangements of the driving gears together with the input shaft, differential gears, the vernier cams and the units, 10's and 100's, and 1,000's stepped wheels of a 2000 x 2 arrangement.

Fig. 1B is a front elevational view taken from the line 1B of Fig. 1A from the diagrammatic arrangement.

Fig. 2 is a transverse vertical sectional view upon the line 2—2 of Fig. 1.

Fig. 3 is a transverse vertical sectional view upon the line 3—3 of Fig. 1.

Fig. 3A is a front elevational view of the cam device associated with the 2000 x 2 arrangement and positioned on the 1000's shaft.

Fig. 3B is a transverse fragmentary view upon the line 3B—3B of Fig. 3A.

Fig. 4 is a transverse vertical sectional view upon the line 4—4 of Fig. 1.

Fig. 5 is a fragmentary transverse sectional view taken upon the line 5—5 of Fig. 4, showing the brake roller arrangement associated with the printing motor.

Fig. 6 is a vertical sectional view showing the arrangement of type setting bars and type setting rollers together with the inking pad arrangement.

Fig. 7 is a fragmentary horizontal sectional view upon the line 7—7 of Fig. 6.

Fig. 8 is a diagrammatic side elevational view partly in section of the units, 10's and 100's setting wheels together with the vernier cams in a 1000 to 1 arrangement in the position after translation and before it has been set or adjusted for printing.

Fig. 9 is a view similar to Fig. 8, showing the units, 10's and 100's setting wheels after they have been set, so that the printer is ready for printing.

Fig. 10 is a vertical sectional view of one of the differential gearing members which permit the operation of the vernier cams.

Fig. 11 is a vertical sectional view taken upon the line 11—11 of Fig. 10 and upon the same scale as Fig. 10.

Fig. 12 is a diagrammatic top plan view showing the driving gears together with the input shaft, differential gears, the vernier cams and the units, 10's, 100's and 1000's stepped wheels of a 5000 x 5 arrangement.

Fig. 13 is a front elevational view of the arrangement of Fig. 12.

Fig. 13A is a front elevational view of the central stepped cam shown in Figs. 12 and 13 for the 5000 x 5 arrangement.

Fig. 18b shows the balance of the wiring diagram.

Figure 14:
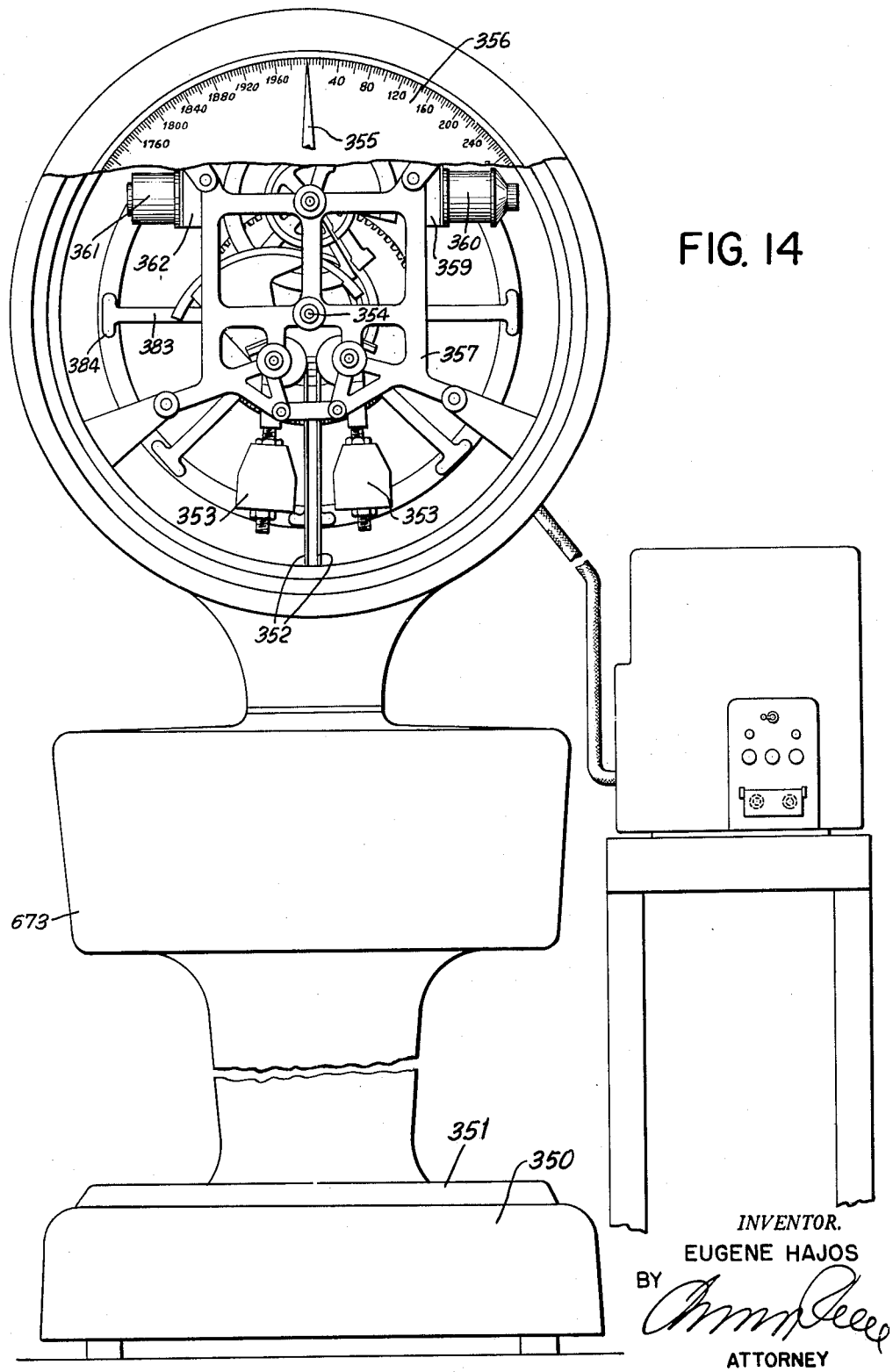
Fig. 14 is a front elevational view of the scale arrangement from which the actuated signals are transmitted to the remote printer of Figs. 1 to 13.

Referring initially to Figs. 1 to 7, which respectively show the 2000 x 2 arrangement, there is shown a main input shaft A to which the readings of the main scale mechanism of Fig. 14 are translated through the direct current motor V and the Selsyn motor B combination.

To aid in understanding the invention, and particularly the important and essential feature of readjusting after the translation has been completed, Figs. 1A, 1B, 7B and 7C diagrammatically show the readjusting operation for a 2000 x 2 arrangement.

Figs. 8 and 9 diagrammatically show the readjusting arrangement for a 1000 x 1 arrangement, while Figs. 12 and 13 show the readjusting arrangement for a 5000 x 5 arrangement.

In connection with Figs. 8 and 9, correspondingly functioning parts as those in Figs. 1 to 7 are indicated by the same numerals and letters primed.

Referring to Figs. 12, 13 and 13A, correspondingly functioning parts as in Figs. 1 to 7 are indicated by the same letters and numerals provided with a superior 2.

In general after termination of translation the units shaft will be slightly displaced in each instance and will be exactly adjusted by star wheel arrangement to the nearest integer, while in connection with the 10's, 100's and 1000's shafts, the displacement will be corrected by vernier cam arrangements acting upon the successive shafts.

Referring to Fig. 1A, on the shaft A there is provided and adjusting star wheel C, a units vernier cam D and a units step wheel E.

On the next shaft F, which is the 10's shaft, there is provided a differential gear device G, an adjusting lever H, a vernier cam I and a 10's step wheel J.

On the next shaft K, which is the 100's shaft, there is provided the differential gear L, the adjusting lever M, the vernier cam N and the 100's step wheel O.

On the next shaft P there is shown a differential gear Q, the adjusting lever S and the vernier cam CC. At the left there is still another shaft, the 1000's shaft T, on which is mounted the differential gear device DD, the adjusting lever BB and the 1000's step wheel U.

Referring to the 2000 x 2 arrangement in Figs. 1 to 7, and especially Figs. 1A, 1B, 7A and 7B, in this arrangement the scale wheel measures units of 2 lbs. and will have a total capacity of 2000 lbs., so that the step wheels E, J, O, and U in Fig. 2 will be calibrated so that each step on the step wheel E will represent 2 lbs., each step on the step wheel J will represent 10 lbs., each step on the step wheel O will represent 100 lbs. while each step on the step wheel U will represent units of 1000 lbs.

Referring to the 1000 x 1 arrangement shown diagrammatically upon Figs. 8 and 9, each step on the units wheel E' represents 1 lb., each step on the 10's wheel J' represents 10 lbs., while each step on the 100's wheel O' represents 100 lbs.

In the 1000 x 1 arrangement, the scale will have a capacity of 1000 lbs. and be able to weigh and register units of 1 lb.

In the 5000 x 5 arrangement shown in Figs. 12 and 13 the scale will only indicate and register units of 5 lbs. and will have a capacity of 5000 lbs.

As shown in Fig. 13, each step of the twenty steps on the step wheel E² of Figs. 12 and 13 will represent, respectively 5, 10, 15, 20 and so forth, up to 100 lbs. at the last step.

The step wheel J² will represent units of 100 lbs. and will have ten steps. The step wheel O² will have ten steps and each step will represent a unit of 1000 lbs.

The final step wheel U² will have five steps and each step will represent a unit of 10,000 lbs.

Referring particularly to Figs. 1, 2, 3 and 4, which show the 2000 x 2 remote printer arrangement, there is shown a base 50 having the legs 51 upon which is mounted the rear support 52 by the bolts 53 and the base flange 54.

The rear support 52 also carries the housing 55 having the top wall 56, the side walls 57, 58 and 59. The housing 55 has the angle wall 61 and 62 and the end wall 63.

Below the shelf 62 the side walls are turned inwardly as indicated at 64 and 65 in Fig. 1.

Mounted upon the floor 66 is the base 67 of the direct current motor V (see particularly Fig. 3). The base 67 of the direct current motor V is mounted on the floor 66 of the casing 55 by bolts 68.

As shown in Fig. 4 the shaft 69 drives the pulley 70. The pulley in turn drives the belt 71, which drives a pulley 72 upon the shaft 73 of the Selsyn motor B.

On the shaft 73 is the gear 74 which meshes with and drives the gear 75 upon the shaft A.

The Selsyn motor B has a base 76 bolted at 77 upon the bracket 78 support.

On the shaft A will also be positioned the pinion 79 which meshes with the gear 80 and has a 10 to 1 ratio with respect to said gear 80.

Through the gears 79 and 80 the shaft F will be turned once for each ten revolutions of the shaft A. As the shaft F turns, it will turn the pinion 90, which meshes with the large gear 91 on the shaft K. The ratio of the pinion 90 to the large gear 81 is a ten to one ratio so that the gear 91 will make $\frac{1}{10}$ of a turn for each complete turn of the pinion 90 or the shaft F will turn ten times for each revolution of the shaft K.

The shaft K also drives the pinion 92 which carries the stepped wheel O for the 100's row of digits. The pinion 92 in turn drives the large gear 93 on the shaft P in a ten to one ratio.

The gear 95 on the shaft T which carries the stepped 1000's wheel U will also be operated in a predetermined ratio in respect to the shaft P. The gear 95 is connected to the unit weight switch R through gearing, as shown in Fig. 1A, by which it is possible to extend the range of the scale by applying unit weights at the scale mechanism of Fig. 14.

In the lower part of the housing 55 there is positioned a print motor W (see Figs. 3, 4 and 5) having the shaft 110. The print motor W is provided with a brake arrangement and a print motor micro-switch arrangement Y.

The shaft 110 of the print motor W, through the worm 111, drives the worm gear 112, which in turn drives a cam shaft 113.

On cam shaft 113 is the brake release cam 114 which acts upon the roller 115 on the extension 116 of the arm 117 (see Figs. 4 and 5). The arm 117 is pivotally mounted at 118 upon the base 119, which in turn is mounted upon the floor 66 of the housing 55. The brake arm 117 is provided with a spring 117a which is biased in direction 117b.

When the roller 115 is in the recess 120, the edge 121 of the arm 117 will contact the enlarged portion 122 of the shaft 110, braking rotation of the shaft 110. The cam or oblique edges 123 will serve to lift or drop the roller 115 into and out of the recess 120. At the same time the cam 124 has a lobe 125 which acts upon the roller 126 on the lever 127 of the micro-switch Y.

As shown upon Fig. 4, there is a lever 140 actuated from the cam shaft 113. The lever 140 is mounted upon the pivoted rod 141 and is pivotally connected at its upper end 142 to the link 143. The link 143 has a pivotal connection at 144 to the reciprocatory star wheel setting bar Z. The bar is normally biased in the direction 145 (see Fig. 4) by the spring 146 and it has slotted openings 147, 148, 149 and 150 which receive the shafts T, P, K and F, respectively.

These slots 147 to 150 are sufficiently long to permit the bar Z to slide freely upon the shafts T, P, K and F under action of the lever 140.

The nose or oblique end 151 of the bar Z will act upon the star wheel A and will have the effect of aligning the star wheel so that one of the recesses of the star wheel conforms in position to the nose 151.

The star wheel C with the five recesses, as shown in Fig. 4, is for a 2000 x 2 arrangement, whereas a 1000 x 1 arrangement has a ten point star wheel.

Referring to Fig. 3, the cam shaft 113 also is provided with the cams 165 and 166. The cam 165 has the lobe 167 which acts upon the roller 168 on the arm 169 of the lever 170. The lever 170 is pivotally mounted upon the shaft 141. The cam 166 has a recess 171 which acts upon the roller 172 to reciprocate the lever 140, which in turn actuates the star wheel setter bar Z, as shown in Fig. 4.

The lever 170 has a pivotal connection at 173 to the link 174, which in turn has a pivotal connection 175 to the ear 176 on the vernier release bar AA (see Fig. 3).

The vernier release bar has a series of slots 177, 178, 179, 180 and 181 which ride upon the shafts T, P, K, F and A.

The vernier release bar also has a plurality of elongated cam elements 182, 183, 184 and 185 of decreasing length to the right, which normally act upon the pins 186, 187, 188 and 189 of the levers H, M, S and BB (see Fig. 3), to keep such levers lifted from the vernier cams. D, I, N and CC during translation.

It will be noted that each of these levers H, M, S and BB is provided with the end contact pins 190, 191, 192 and 193, which are biased toward the cams CC, N, I and D by the springs 194, 195, 196 and 197 (see Fig. 3).

After translation is completed, and before printing, the lever 140 will move the star wheel setting bar Z to the right. The unit step wheel E will initially have been moved by contact of the nose 151 with the recess in the star wheel A, as already described in connection with Fig. 4.

An interval later the lever 170 will move the vernier cam bar also to the right. At the beginning of the latter movement, the pins 186, 187 and 189, as shown in Fig. 3, will be at the right portion of the lobes or cams 182, 183, 184 and 185.

Then as the bar AA starts to move to the right, the lever H will be released first and will be permitted to drop upon the cam D. Even though at this point the shafts A and F are fixed, this movement of the lever H through the differential G (see Figs. 1A and 1B) will move the 10's step wheel J.

When this operation has been completed, the pin 188 will move off the longer lobe or cam 184 and this will permit the pin 192 to contact the vernier cam I, with the result that the step wheel O measuring 100's will be moved through the lever M and the differential L.

The last lever to move, namely the lever BB, will not move until the pin 186 slides off the lobe 182 onto the cam CC (see Fig. 3), whereupon the spring 194 will draw it down against the cam or wheel CC. This will result in the lever BB acting through the differential DD adjusting the step wheel U indicating 1000's. Now the arrangement is ready for inking and printing.

It will be noted, by reference to the cam 165, that the bottom portion of the cam, as shown in Fig. 3, is substantially of the same radius for about 180° and will maintain the lever AA in the set position before the roller 168 again rises or is lifted onto the lobe 167 whereupon the bar AA will move to the right and translation may again take place.

The lever 140 will retract the bar Z during the time the roller 172 is in the recess 171, permitting translation to take place through the shaft A.

Referring to Figs. 8 and 9, to illustrate the operation of the present invention as applied to a 1000 x 1 arrangement, assuming that the translation through the shaft A' will turn the shaft A' and the step wheel E' 19.9 turns to represent a weight of 199 lbs.

Through the gearing 79'—80', the shaft A' will cause a rotation of the shaft F' of 1.99 revolutions while through the gearing 90—91 between the shaft F' and the shaft K', the shaft K' will be turned 0.199 of a revolution.

The contact fingers 210', 211' and 212' upon the type setting arms PP', QQ' and RR' would be moved to contact the steps as shown in Fig. 8, the type wheels would be set to print the figure 209', which obviously would be incorrect since it is desired to print the figure 199, which is the correct weight.

To be certain that the correct weight 199 is printed, the translation or initial shaft A' is first adjusted in proper position.

This will result in the shaft A' and its step wheel E' being adjusted correctly in the 9 position with the step wheel being moved backwardly or forwardly, depending upon whether the weight was a little above or a little below 199 lbs. Then it is necessary to reverse the movement of the step wheel J' so that the contact element 211' will strike the lowermost step 9 instead of the uppermost step O'.

To do this, the lever H' will be released and the pin 193' on the end of the lever H' will be moved back so that the 10's step wheel J' will be moved through the differential mechanism of Figs. 10 and 11 with the lowermost step 9 in position to contact the contact points or feeler arm 211'. The movement will take place through the differential of Figs. 10 and 11 even though the shaft F' stands still.

The vernier cam D' is so designed and calculated that upon the upward movement of the pin 193', it will return the step wheel J' the amount that it was over-driven. For example, with 191 lbs. it would be over-driven the slightest amount whereas with 199 lbs. it would be over-driven the greatest amount, and the vernier cam D' is so calculated and designed that its position will in each case readjust the step cam J' to its proper position, so that the contact element 211' will strike the step 9, which is the lowermost step.

Referring to the last step wheel O', it is necessary to adjust this wheel, as is indicated in Figs. 8 and 9, from the position of Fig. 8 to the position of Fig. 9, so that the type will be set to print 199.

To do this, as soon as the step wheel J' has been set, the lever M' will be released and moved downwardly so that the pin or stud 192' contacts the vernier cam I'. This will result in the step wheel O' being moved backwardly a sufficient amount so that when the contact element 212 strikes it, such contact element will strike the step indicating 1.

It will be noted that the vernier cam I' has also been calculated so as to correct the amount of over-drive of the step wheel O'.

The resetting operation in connection with the diagrammatic arrangements shown in Figs. 1A, 1B, 7B and 7C will take place in the same manner. For example, in Fig. 1B all of the stepped wheels E, J, O and U are set at zero.

Figure 7A:
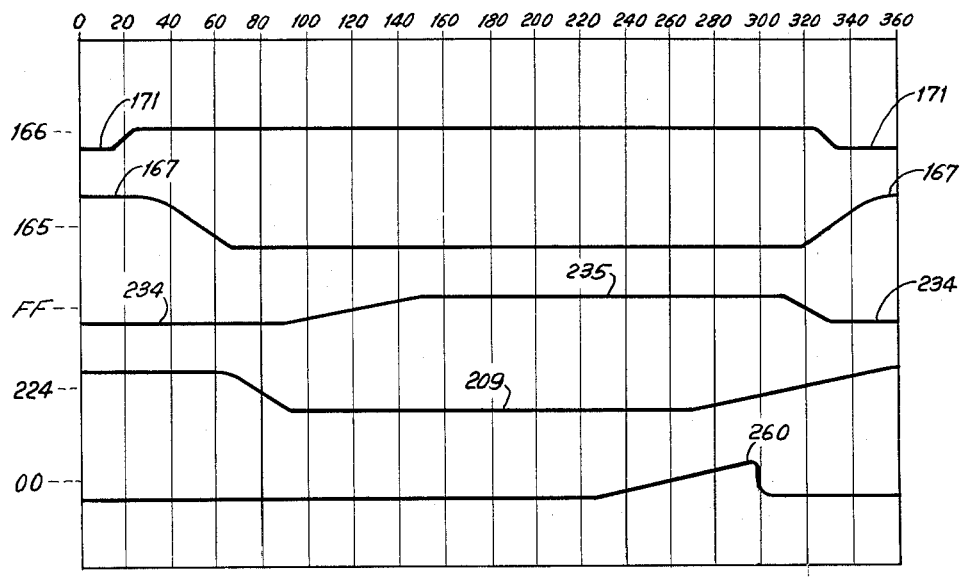
Fig. 7A is a diagrammatic chart showing relative timing and operation of the various cams in connection with the setting, adjustment, inking and printing operations.
Figure 7B:
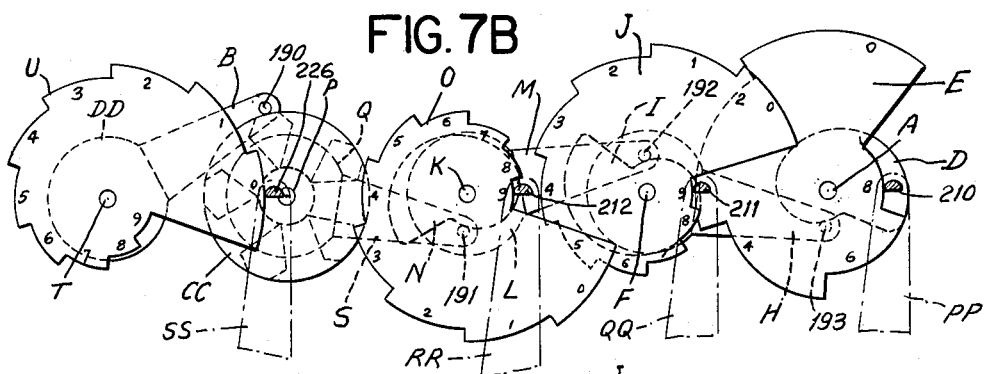
Fig. 7B is a front elevational view similar to Fig. 1B showing the associated vernier cams and stepped wheels after the verniers have operated to correct the setting and with the device in printing for printing with a load of 998 pounds.
Figure 7C:
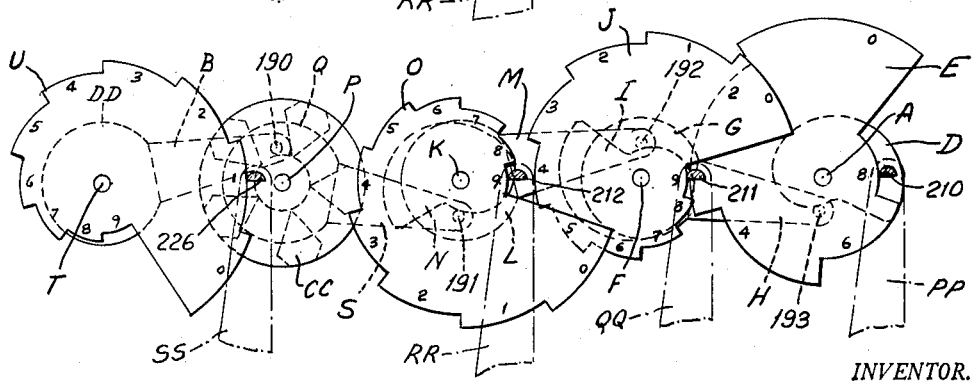
Fig. 7C is a front elevational view similar to Figs. 1B and 7B showing the position of the vernier cams and stepped wheels after adjustment and when they are ready for printing for a weight of 1998.

In Fig. 7B they are set to print 0998 pounds. In Fig. 7C they are set to print 1998 pounds. Both Figs. 7B and 7C show the stepped cams after they have been readjusted by the levers H, M, S and BB and the vernier cams D, I, N and CC.

After the readjusting has been completed upon manual or automatic actuation, the printing will take place and the device will again be ready for translation.

In printing, as is shown in Fig. 1, but in greater detail in Figs. 2, 6 and 7, there is shown the type setter bars EE, the cam FF, the type release lever GG, the inker operating rod HH, the inking pad II, the felt inking roller JJ.

As is shown in Fig. 2, type adjusting bars EE have extensions QQ, RR, and SS, which control the position of the type wheels TT, UU, VV and WW. These type wheels are carried in the type head MM.

After the step wheels have been adjusted by means of the bar AA and the levers H, M, S and BB, the bars EE, (see Fig. 2), one for each arm PP, QQ, RR and SS, will be moved to the left in the direction 216 by the spring 217. The bars EE ride upon the guide rods 218 and 219 by means of the slots 220 and 221. The lever GG, pivotally mounted at 222 inwardly of the cam shaft 113, has the follower roller 223 riding upon the cam 224.

The racks 227 at the lower edge of each bar EE mesh with the gears 228 on the type setting sectors LL. The sectors LL in turn mesh with gears 229 carried by the pivot-mount 230 on the swinging frame structure 231 of the type head MM.

When the lever GG is thrown to the left, as indicated at 216, the lug 225 will follow because of the action of the spring 217, permitting the printing mechanism to be set.

On the other hand, when the printing is completed, the lever GG will move the bars EE to the right, shifting the levers PP, QQ, RR and SS and their contact members 210, 211, 212 and 226 away from the step wheels E, J, O and U, to permit translation again to take place.

The gears 229 in turn mesh with the gears 232, which in turn mesh with the gears 233, which control the type wheels TT, UU, VV and WW, as shown best in Figs. 2, 6 and 7.

Whenever the type wheels TT, UU, VV and WW have been set, so that there will be correct printing alignment, the lever HH, which serves as an inker operating rod, will be actuated by the cam FF. The cam FF has a recessed portion 234 and a lobe 235 to act upon the follower roller 236 on the bar HH. The bar HH has a guide slot 237 receiving the pin 238 which is mounted upon the stand 239.

The right end of the rod, as indicated at 240, has a pivotal connection to the plate member 241, having the slot 242 to fit upon the pivot rod 243 of the gears 233 and the type wheels, TT, UU, VV and WW.

At its lower end, the plate 241 has a lug 244 carrying the inking roller JJ, which is designed to wipe across the inking pad II having the inking felt 245 in the casing 246 and held in a stand 247.

The cam OO in Fig. 6 having the lobe 260 turning in the direction 261 will act upon the roller 262 on the rod 263. The rod 263 has a bearing at 264 in the stand 239. The rod 263 has a collar 265 with a forwardly projecting rod 266 around which is the coil spring 267.

The dog latch NN has a slot 268 which will receive the collar 269 and has a downwardly projecting boss 270 which receives the upper end of the spring 271, which tends to bias the dog upwardly in the direction 272. The dog is pivotally mounted at 273 in the stand 239.

The spring 267 first will be compressed, when the bar 274 is moved in the direction 275. Referring to Fig. 2, the dog NN has a cam 700 which will be contacted by the lower edge 701 of the collar 265. This will depress the dog NN and release the collar 269, permitting the frame of the printer mechanism MM to be moved rapidly downwardly against the platen 277 under the force of the compressed spring 267. The type wheels W will normally be pressed against a sheet of paper or strip of paper resting on the rubber pad or platen 277.

The gear arrangement 229, 232 and 233 will keep the type wheels vertical when they are moved down against the rubber platen 277 and will result in a clear, accurate print thereof upon a strip of paper or other recording material.

In Fig. 7A is shown the relative movement and operation of the various cams 166, 165, FF, 224 and OO, all of which are actuated by the cam shaft 113.

The cam 166 is represented by the first or top curve on Fig. 7A. The cam 166 controls the star wheel C and adjusts the stepped cam E on the shaft A. This cam has the recess 171 as indicated and is shown upon Fig. 3.

The cam 165 actuates the vernier cam bar AA. The cam 165 has the lobe 167 as shown on Fig. 7A.

The cam FF will operate the ink wiping and unlatching arrangement, shown upon Fig. 2, and it has a lobe 235 and a recess 234.

The cam 224, also shown upon Fig. 2, has a recessed portion 209 and it serves to set up the type wheels ready for printing.

The cam OO serves to cause printing and it has a lobe 260 shown in Fig. 6.

It will be noted by reference to Fig. 7A that assuming the cam shaft 113 to start at 0°, the star wheel C is adjusted at about 20°, the vernier levers and cams are operated at 40 to 60° and the ink wiper arrangement becomes operative at about 100 to 160°

The type wheels are set up at about 60 to 100° and the printing takes place at about 300°. After printing, all of the cams 166, 165, FF, 224 and OO are returned to their original position, while the cam shaft 113 is turned from 300 to 360°. The cam shaft 113 then is stopped by the braking arrangement as shown in Figs. 4 and 5.

In reference to the differential gearing arrangements indicated at G, L and Q in Figs. 1A and 12 and at DD in Fig. 1, these arrangements permit the levers H, M, S and BB to re-adjust the stepped wheels E, J, O and U after translation has ceased.

As is shown best in Figs. 10 and 11, the differential gearing arrangement has an input shaft 300 which extends into the recess 303 and is pinned at 301 to the neck 302 in which said recess 303 is formed.

The neck 302 is integral with the gear 304, which meshes with the pinions 305 and 306. The pinions 305 and 306 have the stud shafts 307 and 308 which are mounted in and turn in the gear housing 309.

The output shaft 310 extends into the recess 311 in the hub 312 of the gear 313. This shaft 310 is pinned at 314 to turn with the hub 312. The gear 313 meshes with the pinions 315 and 316. The pinions 315 and 316 rotate upon the stud shafts 317 and 318, which have bearings in the gear housing 309.

The function of the differential gearing device of Figs. 10 and 11 is to permit turning of the stepped wheels E, J, O and U even though the gear wheels 75, 79, 80, 90, 91, 92, 93 and 94 are fixed in position and after the translation through the shaft A has been completed.

Referring to Figs. 10 and 11, it may be assumed that this is the unit G, which is upon the shaft F, as shown in Fig. 1. The input will come through the shaft F at the right of Fig. 10, which corresponds to the top of Fig. 1, through the gearing 79 and 80.

The shaft F being pinned at 301 to the hub 302 will turn the gear 304, which in turn meshes with the gears 305 and 306. The gear 304 does not mesh with the gears 315 and 316. However, the gears 305 and 306 do mesh with gears 315 and 316 but they do not mesh with the gear 313. The gear 313 meshes with the gears 315 and 316. The gear 313, through its pin connection 314 to the shaft 310, will then drive the step wheel J' or J².

Normally, during direct translation, the drive will be through shaft F, gear 304, gears 305 and 306, gears 315 and 316, gear 313 in shaft 310, to the step wheel in a one-to-one ratio between the shaft section 300 of the shaft section 310.

During readjustment, the differential is driven by one of the arms M, S or BB. The end of said arm is fastened to the flat side 325, as shown in Fig. 11, of the differential gear housing by the screws 326.

When the vernier levers M, S and BB are rotated by the springs 194, 195, 196 and 197, the levers will cause the differential gear housing 309 to rotate.

The gear 304 is locked to the shaft F by the gearing 79 and 80. However, the pinions 305 and 306 can rotate in mesh with the locked gear 304 and in turn drive the gears 315 and 316 and the gear 313, which in turn will drive the shaft 310 at a ratio of 2 to 1 in the opposite direction.

The gear housing 309 has a center plate 323 which rotates between the two gears 304 and 313. The center plate 323 will be mounted upon the pin 322, which can rotate within the hub 312. The end of the pin 322 will carry the disk 324, which is positioned between the gear housing section 323 and the gear 304.

Figure 16:
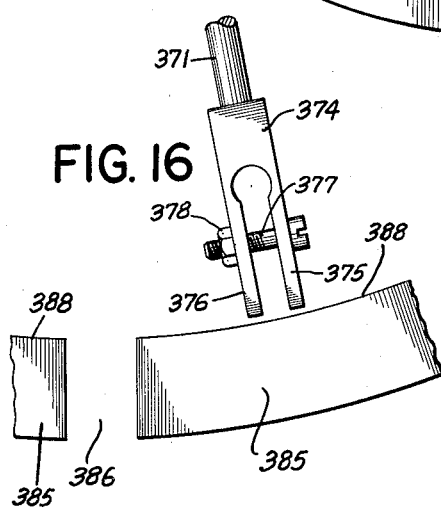
Fig. 16 is a detail fragmentary elevational view upon an enlarged scale, showing the spark gap electrode of the auxiliary indicator in rotated position.
Figure 17:
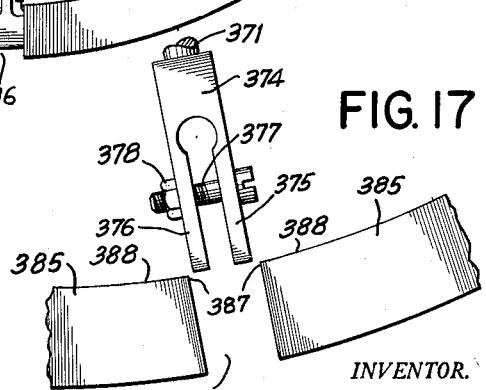
Fig. 17 is a fragmentary enlarged view similar to Fig. 16 showing the spark gap electrode with the follow-up sector rotated to position in alignment with the gap.
Figure 18A:
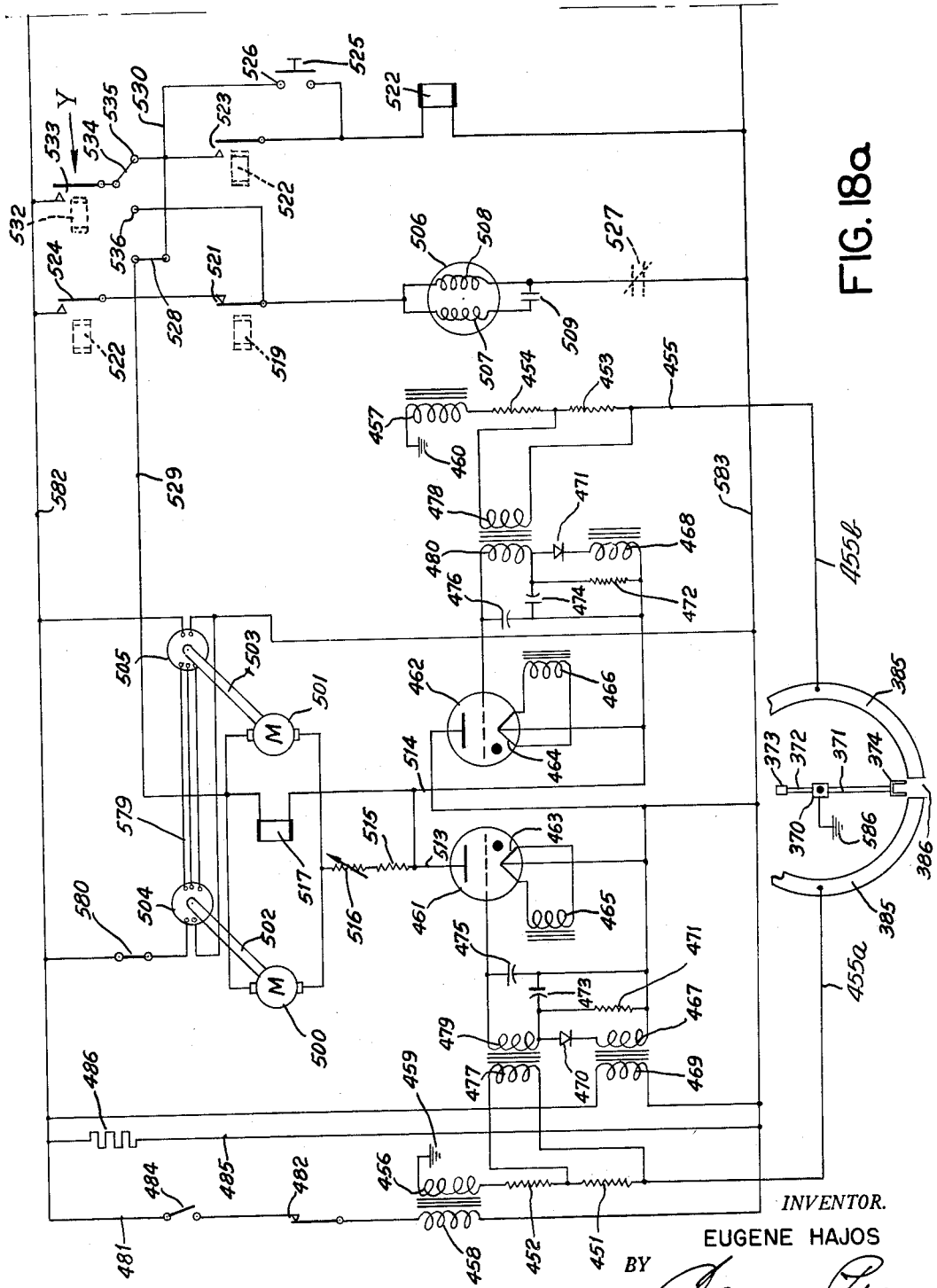
Fig. 18a is part of the wiring diagram showing the connections between the printer and the electrode connections of the scale mechanism.

In the operation of the printer so far described, translation first takes place from the weighing mechanism as shown in Figs. 14, 15, 16 and 17 through the wiring system of Figs. 18a and 18b and the motor combination B and V. The gearing will be driven through the shaft A from the direct current motor V, and kept in synchronism by the Selsyn motor B.

During the translation the gear 75 will be driven from the units shaft A. The shaft A will drive shaft F at a 10 to 1 ratio through the gearing 79 and 80. The 10's shaft F will drive 100's shaft K in a 10 to 1 ratio through the gearing 90 and 91.

Normally, after translation has ceased and the shaft A is stopped, the stepped units wheel E, the stepped 10's wheel J, and the stepped 100's wheel O will be fixed in position approximately corresponding to the weight which is to be printed by the printer mechanism. However, these wheels E, J, and O will not be in true position to enable the printer mechanism to print the whole numbers or digits and normally the stepped wheels E, J and O will have been driven slightly past their proper position for printing.

Therefore, it is necessary, after translation has been completed to have each stepped wheel E, J, O and U readjusted by cooperation of the vernier cams D, I, N and CC, the vernier levers H, M, S and BB and differential gearing G, L, Q and DD.

This operation is successive; each successive stepped wheel E, J, O and U being adjusted after the preceding units, 10's or 100's has been set, because of the location and increasing length of the lobes 185, 184, 183 and 182 on the reciprocating reset vernier bar member AA of Fig. 3.

As soon as the translation through the shaft A has stopped, and upon manual or automatic initiation, the cam shaft 113 will be driven by the print motor W (see Figs. 3 and 4).

The brake arm 117 of the brake X (see Figs. 3, 4 and 5) will be lifted out of the slot or recess 120 and will ride on the outer portion of the wheel 114. In this position the worm 111 will drive the gear 112 and the cam shaft 113. The lobe 125 of the cam 124 at the same time will actuate the micro-switch Y. After one complete revolution of the cam shaft 113, the micro-switch Y will return to its original position opening the circuit to the print motor W.

As a first operation, the cam 166 will turn, elevating the roller 172 out of the recess 171 and throwing the upper end of the lever 140 to the right, moving the bar Z toward the star wheel C. The nose 151 will index the star wheel C and turn the units stepped wheel E to correct position for printing. The number of points on the star wheel A will depend upon the ratio.

In the arrangement shown, the set-up on Figs. 1, 3, 4, 6 and 7 is for a 2000 x 2 ratio, in which the star wheel A has five points and five recesses.

In the arrangements of Figs. 8 and 9, the star wheel C' would have ten points and recesses to correspond to a 1000 x 1 ratio.

In the arrangement shown in Figs. 12 and 13 the star wheel C² would have twenty points to correspond to a 5000 x 5 arrangement.

After the star wheel C has been set, by the right-hand movement of the bar Z, the star wheel C will be held in position as long as the roller 172, as shown in Fig. 3, rides upon the elevated portion of the cam 166.

Immediately after this setting of the star wheel C, the roller 168 will ride off the elevation 167 and toward the lower portion of the cam 165 (see Fig. 3). As this occurs, there will be a relatively rapid movement of the bar AA to the right. As a result the pins 189, 188, 187 and 186 are successively released from the elevated portion of the lobes 185, 184, 183 and 182. The pins 193, 192, 191 and 190 will come to rest upon the vernier cams D, I, N and CC in succession.

The spacing and length of the lobes 185, 184, 183 and 182 is such that the movement of each lever H, M, S and BB will be completed before the next lever moves.

As each lever H, M, S and BB moves, so that its end pins 193, 192, 191 and 190 are thrown against surface of the vernier cams, D, I, N and CC, under the action of the springs 197, 196, 195 and 194, the differentials G, L, Q and DD will turn the stepped wheels J, O and U in succession to correct printing position.

Then the roller 168 will continue to ride upon the lower portion of the cam 165, and the bar AA will be kept to the right until the operation of the printer is completed.

Now, that the stepped cams E, J, O and U have been set, type-setting levers PP, QQ, RR and SS are caused to contact the appropriate lobe or step of the wheels E, O, J and U by the cam 224, permitting the roller 223 on the lever GG to ride off the elevated part thereof and to ride the recessed portion 209 thereof. This will result in the upper end of the lever GG moving to the left under the action of the springs 217 with the result that the stop members or bars EE and extensions PP, QQ, RR and SS move to the left and the contact members 210, 211, 212 and 226 are brought up against the appropriate steps of the stepped wheels E, J, O and U. Then the cam FF will cause the roller 236 to move up upon the elevated portion 235 and will cause the bar HH to move to the right, moving the felt inking roller JJ to contact the inking pad 245.

As the levers PP, QQ, RR and SS move to the left, as shown in Figs. 2, 6 and 7, they will move the racks 227, the pinions 228, the sector gears LL and the gearing trains 229, 232 and 233 to place the type wheels TT, UU, VV and WW in proper printing position for subsequent movement down upon the strip of paper or other recorder positioned on the platen 277.

As soon as everything is in position, the lobe 260 will act upon the roller 262, forcing the bar 263 to the right, compressing the spring 267. The bar 274 is released from the locking dog NN by action of collar 265 on nose 700 of the dog NN. The bar 274 will then move to the right and will swing the printing mechanism on the pivot 230 down against the platen 277.

As soon as the printing has been completed, the entire arrangement will revert to initial position, as indicated in Figs. 2, 3, 6 and 8, waiting for the next translation from the weighing scale.

To change the unit weights, a unit weight switch R is provided to add or subtract unit weights at the scale.

Referring to Figs. 1 and 1A, the unit weight switch R has a knob 650 with a pointer 651 thereon. By turning the knob 650 it is possible to operate the switch 652. The switch 652, by a remote connection to the scale of Fig. 14 will drive suitable mechanism (not shown) to add unit weights to the tare mechanism of the weighing mechanism of Fig. 14.

Also, the turning of switch R through the gears 94 and 95 will rotate a step cam mechanism U one unit for each 60° turn of the knob 650, so that the printer mechanism will be set to print correctly with the setting of the tare mechanism in the scale mechanism of Fig. 14, and add the unit weight value to the dial reading of the scale mechanism.

The vernier cam CC as shown in Figs. 3A and 3B has the recesses 656 and elevated portions 657.

The pin 190 of the lever BB can rest either upon the elevated portion 657 or the recess 656. When on the elevated portion 657, it will be nothing and will not add to the weight. When the pin 190 is in the recessed portion 656, it will add a unit weight of 1000 to the reading an indication which is registered by advancing the stepped wheel U on the 1000's shaft T.

For example, in a 2000 x 2 arrangement, when the weight is 998 lbs., one of the lobes 657 should be in the position to contact the pin 190, as shown in Fig. 3A, so that there is no indication or registry of 1000 lbs. and there will be a zero printed on the fourth printing wheel, which corresponds to the 1000's reading.

On the other hand, if the weight is 1998 lbs., the vernier cam CC will be turned so that the recess 656 receives the pin 190 and as a result, the 1000's type wheel will be set so that it will register in the 1000's, and will give an indication of 1998 when the printing is made.

When it is desired to measure weights in excess of 2000 lbs., such as 2998, it will be necessary to turn the unit weight knob 650 60°, which through the gearing 94 and 95 will turn the step wheel U to a 2000 lbs. reading, so that it will be possible in this manner to obtain readings, for example, of 2998 lbs. and 3998 lbs. Beyond that it will be necessary to continue adding another unit weight of 2000 lbs. by turning the knob 650 60° for each 2000 lbs. addition.

The unit weight switch is mounted upon the oblique bars 659 (see Fig. 4) and are fastened by screws 660 to the side plates 661. The two side plates 661 are connected together by the bolts 662 and spaced by the sleeves 663.

In connection with the 5000 x 5 arrangement, as shown in Figs. 12 and 13, there is shown the special vernier cam $N^2$ upon the shaft $K^2$. This special vernier cam $N^2$ is shown in a separate view in Fig. 13A.

This vernier cam $N^2$ has a double stepped arrangement, each of which has five steps, each step corresponding to a unit of 1000 lbs.

In the 5000 x 5 arrangement, as shown in Figs. 12 and 13, the shaft $K^2$ is split and through the differential $L^2$ will turn the vernier cam $N^2$.

Rotation through the gearing $79^2$, $80^2$, $90^2$, $91^2$ will turn the shaft $K^2$ and the vernier cam $N^2$. In Fig. 13, with the stepped cam $U^2$ in the position shown, the arrangement will record weights up to 5000 lbs. Each step on the vernier cam $N^2$ is equivalent to 36° on the type setting cam $O^2$.

Now, where it is desired to measure a weight between 5000 and 10,000 lbs., the knob 676 will be turned 60° and this will actuate the switch 677 to add another 5000 lbs. to the tare system of the scale of Fig. 14. The gearing 678 will turn the gearing 679 and the shaft sections 680 and 681.

The shaft section 681 will turn the gearing 682 in a 4 to 1 ratio, causing pinion 683 to rotate the cam $O^2$ so that it will indicate 5000 lbs. each step on the step wheel $O^2$ representing 1000 lbs.

At the same time the gearing 679 will drive the gearing 685 on the shaft 686 and will turn the step wheel $U^2$ 36°. This is equivalent to one-half the step, since each step on the step wheel $U^2$ is 72°. In this respect the printing mechanism which is actuated by the step wheel $U^2$ will be changed for each 72° movement on stepped wheel $U^2$.

In increasing the range to between 10,000 and 15,000 lbs., the knob 676 is turned another 60°. This will turn the $O^2$ back to the zero position and at the same time will turn the step wheel $U^2$ to the next step. The printer then will register between 10,000 and 15,000 lbs.

The next adjustment to enable registry of between 15,000 and 20,000 lbs. will turn the step wheel $O^2$ from the zero to the fifth step, a movement of 180°, and will move the step wheel $U^2$ one-half step.

Normally step wheels $O^2$ and $U^2$ will be so coordinated together that every time the step wheel $O^2$ is advanced 180° from zero to the fifth step, the step wheel $U^2$ will be advanced 36° but will present the same effective step for setting type levers.

On the other hand, when the step wheel $O^2$ is turned the next 180° from the 5 step to the zero step, the step wheel $U^2$ will be turned an additional 36° onto the next step, which will then be effective for the next 180° turn of the step wheel $O^2$.

Each step of the step wheel $U^2$ extends over the angular distance of 72° and this angular distance of 72° corresponds to the full rotation of the step wheel $O^2$ but such full rotation of the $O^2$ corresponds to a spacing of 72° across one of the recesses in the step wheel $U^2$.

Now, referring to the weighing scale arrangement shown in Figs. 14, 15, 16 and 17, there is shown a scale having a base 350 carrying a weighing platform 351, which is connected by suitable leverage and linkage, not shown, to tapes 352 to elevate the pendulums 353 and rotate the indicator shaft 354.

The indicator shaft carries the pointer 355, which assumes a position on the dial 356 corresponding to the actual weight upon weighing platform 351.

Figure 15:
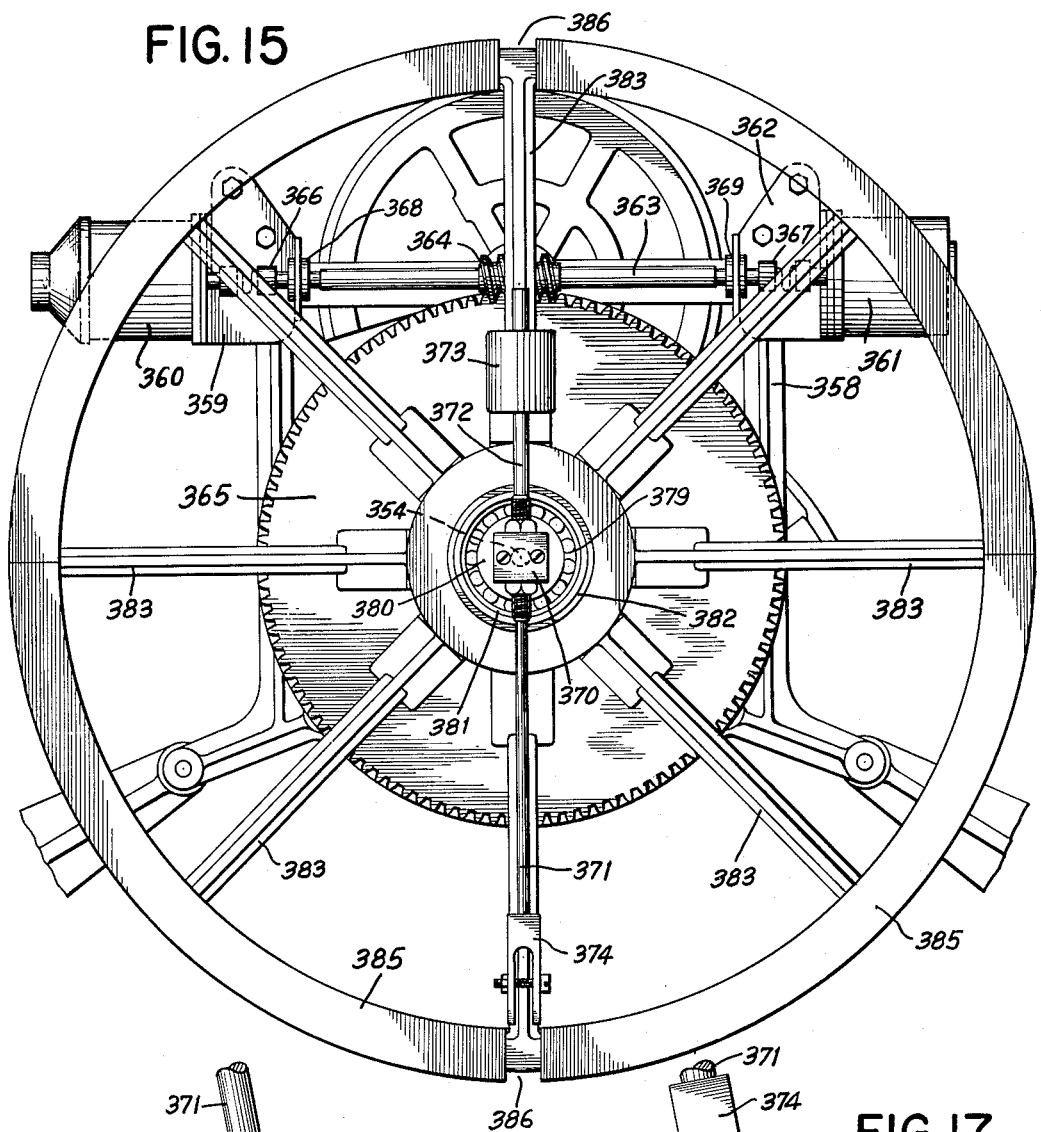
Fig. 15 is a front elevational view upon a scale as compared to Fig. 14 of the motor control of the spark device associated with the scale mechanism.

The pendulums 353 are mounted between a pair of spaced frames 357 in the front and 358 in the rear (see respectively Figs. 14 and 15).

The bracket 359 from the frame 357 supports a motor 360 with which may be associated a Selsyn motor 361 supported by the bracket 362 on the same side, or opposite side, of the frame 357 (see Figs. 14 and 15).

The shaft 363 extends across the device and is centrally provided with a worm 364 meshing with a worm gear 365. The shaft 363 is provided with the couplings 366 and 367, respectively, to the separately excited motor 360 and the Selsyn motor 361.

The bearings for the shaft 363 are indicated at 368 and 369 in Fig. 15.

Referring to Fig. 15, the fitting 370 is mounted upon the end of the indicator shaft 354 and it carries a radial rod 371 having a complementary radial rod 372 which carries an adjustable weight 373.

To the lower end of the radial rod 371 is connected a bifurcated spark electrode 374 (shown also in Figs. 16 and 17), having a pair of legs 375 and 376 and a screw 377 with the lock nut 378 to adjust the distance between the lower ends of the extremities of the legs 375 and 376.

The ball or roller bearings 379, which are mounted on the end of the central member 380, carry the sleeve 381 upon which the worm gear 365 is mounted.

An annular disk or ring 382 is of insulated material and is mounted upon the worm gear 365 and is provided with collector rings (not shown).

The radial arms 383 are rigidly mounted on the sleeve 382 and the worm gear 365 and at their outer ends they have an insulated connection at 384 (see Fig. 14) to the semi-circular sectors 385. The sectors 385 are spaced at gap 386 at their lower and upper ends an approximate distance slightly larger than the outside span of the legs 375 and 376 of the electrode 374.

The radial rod 371 is normally adjusted so that the lower tips of the electrode 374 may swing around closely to and within the inner surface of the sectors 385 to provide an appropriate spark gap.

When the pointer 355 of the scale is at the zero position, and the legs 375 and 376 are midway within the gap 386, the gaps between the legs 375 and 376 and the inner corners 387 will be just too great to form a spark, resulting in an open circuit.

In operation, when a load is applied to the scale platform 351, and the indicator shaft 355 has been rotated to indicate the weight upon the chart 356, the electrode 374 will also be rotated by the arm or bar 371 with the pointer 355, since both are on the same shaft 354. As the electrode 374 moves away from the gap 386, there will be a spark between the ends of the legs 375 and 376 and the inner edge 388 of the sectors 385, closing the circuit to the direct current motors 360 of the scale and the direct current motor V of the printer.

The direct current motors 360 and V, being connected in parallel and being coupled to the Selsyn motors 361 and B, respectively, at the scale and at the printer, will operate in synchronism. The fields of each of the Selsyn motors 361 and B, are connected to a 110 volt, A. C. line, whereas the fields of the D. C. motors 360 and V are connected to a 110 volt, D. C. source.

The D. C. motors 360 and the Selsyn motor 361 will drive the sectors 385 to cause the gap 386 to overtake the electrode 374, as a result of the circuit established through the spark between the inner edge 388 of the form arms 375 and 376 until the space or gap 386 is directly opposite the electrode 374. The space between the legs 375 and 376 and the corners 387 will then be too wide for the spark to jump. This will result in the D. C. motors 360 and V stopping and will terminate the translation to the main shaft A of the printer mechanism of Figs. 1 to 8. As soon as translation is discontinued, the printer may operate in the manner previously described.

The circuit arrangements in general are shown in Figs. 18a and 18b.

Referring to the lower portion of Fig. 18a, there are diagrammatically shown the sectors 385, the electrode 374 opposite the gap 386, the rod 371 with the adjustable counterweight 373.

In the wiring diagram of Figs. 18a and 18b there is shown a connection 455a from the sector 385 which leads to the resistor 451 of 50,000 ohms resistance to achieve a voltage drop of about 90 volts and a further resistor 452 of about 500,000 ohms resistance to limit the sparking current to a few milliamperes to avoid overheating and rapid erosion.

The resistors 453 and 454 are similar to resistors 451 and 452, having the same resistance, and the same function, and are connected by the line 455b to the other sector 385.

The resistors 452 and 454 are connected to the secondaries 456 and 457 of a high voltage regulated transformer, of which the coil 458 is the primary. The transformer 456—457—458 has two high voltage circuits, and includes a condenser, across a special winding which is in series with the primary (not shown) which regulates the output voltage; holding the same to close limits even through wide line voltage fluctuations.

The other end of the right hand winding 456 and the left hand winding 457 are connected to the ground, as indicated at 459 and 460.

The left hand and right hand thyratron tubes 461 and 462 cooperate with forward and reverse sections of ring 385 to cause forward and reverse motion of the latter to the point of balance or null.

The filaments 463 and 464 of these tubes have terminal connections to the secondary coils 465 and 466 of a filament and bias transformer which gives a voltage of about 2.5 volts.

In the same transformer are the secondary coils 467 and 468 which give an A. C. bias of about 6.3 volts. The primary coil of this transformer is indicated at 469. The primary coil 469 is associated in the same transformer with the secondary coils 465, 466, 467 and 468.

The secondary coils 467 and 468 are connected in series with selenium bias rectifiers 470 and 471 to bleeder resistances 471 and 472 having a 0.5 megohm, 1 watt capacity. The bias circuit will also be provided with the filters 473 and 474 of the electrolytic type, having a capacity of 8 microfarads.

To prevent operation due to stray voltages, the mica condensers 475 and 476 are provided with a capacity of 0.001 microfarad. The voltage drop of 90 volts across the resistors 451 and 453 will be applied to the primary coils 477 and 478 of the audio stepdown transformers having a 3 to 1 ratio to the secondary coils 479 and 480.

On the line 481 are positioned the interlocking switch, which will open the circuit in case the back cover is taken off the scale. The time delay relay switch 484 delays operation sufficiently to make certain that the thyratrons 461 and 462 will have been heated up before application of high voltage thereto.

The line 485 connects to the time delay relay heater element 486.

The D. C. motor armatures 501 at the scale mechanism and 500 at the printer have the diagrammatic mechanical connections 502 and 503 to the Selsyn motor armatures 504 and 505.

The printing motor has a condenser type armature 506 which has two windings 507 and 508, one of which, namely 507, is in series with a condenser 509.

The selenium rectifier bridge 510 supplies the fields 511 and 512 for the printer and dial head motors 500 and 501, respectively.

The armatures are connected to the thyratrons (referring to Fig. 18a) through the lines 513 and 514. In the connection is the fixed resistance 515 of 20 ohms, 40 watt capacity with the variable resistance 516 of 22 ohms, 50 watt capacity.

The variable resistor or rheostat 516 limits the speed of the armature motors 500 and 501 and is set so that when the mechanism is new, the friction will be overcome by an increased current and after the apparatus limbers up, the current to the motors will be reduced to a lower amount by adjustment of the rheostat 516.

Associated with the armatures 500 and 501 is the auxiliary delay relay 517 (see Fig. 18a), which operates or is energized when the motor armatures 500 and 501 of the direct current motors are running, which relay will prevent and control the printing operation so that the printing motor armature 506 cannot operate during translation and operation of the D. C. motor armatures 500 and 501.

This delay relay 517 opens when the hunting stops and its contacts 518 open when its coil is de-energized (see Fig. 18b). Said contacts are in series with the quarter-second delay relay 519, across which is placed the electrolytic condenser 520 having a capacity of 20 microfarads.

This relay 519 has a normally closed contact 521. If this contact 521 is closed, the printer motor will operate immediately to print but if the motor armatures 500—501 are still turning during the translation, the contact 521 will be open and there will be no circuit through the contact 521 to the print motor armature 506. This circuit will only be established when the armatures 500—501 stop turning and translation ceases.

The auxiliary relay 522 has a normally open contact 523 and a normally open contact 524 (see Fig. 18a), both of which open and close together. Normally, both these contacts will be open but when coil is energized, both contacts 523 and 524 of Fig. 18a will close.

Associated with the circuit of the coil of the auxiliary relay 522 is the manually operated weigh and print button 525 which may be pressed down to close the circuit to the coil of the relay 522 across the contacts 526 when it is desired to print. Pressing down of the button 525 will result in energization of the coil of the relay 522, closing both contacts 523 and 524 and causing operation of the print motor 506. At the same time the cam shaft 113 will rotate, being driven by the print motor W until the microswitch Y is again actuated by the cam 124 which will stop the motor W.

In series with the print motor armature 506 is the strip recorder interlock 527 which will prevent printing when the recorder strip of paper or other material is not in position in the machine.

The repeat print switch 528 is positioned between the lines 529 and 530 and it will stop the printer if the load is changed and will prevent printing if the scale is moved. The switch 528 is toggle-operated together with the switch 531 of Fig. 18b, which will enable repeating of the previous printing.

When the switches 528 and 531 are open, they will stop the translation but will permit the print motor to operate to print or re-print the weight indication. Normally, the weigh and print button 525 will only be pressed when the hunting ceases and the translation has ceased, so as to obtain a print of the weight, and this can only be done when the quarter-second delay relay 519 drops out.

The under voltage relay 532 (see Fig. 18a) will normally open the circuit in case of under voltage and will prevent operation until there is a proper voltage on the line to the print motor armature 506 of the D. C. motor armatures 500—501.

The swinging contact 534 of the print motor microswitch Y (see Fig. 4) will be operated by the cam 124 and the cam shaft 113. As shown in Fig. 18a, when the print motor switch 534 is on the contact 535, the print motor 507 is not operating and the device is either translating or at rest. When, however, the switch 534 has been thrown over to the contact 535, the cam shaft 113 will be rotated, causing the cycles of operations shown in Fig. 7A.

Referring to Fig. 18b, the selenium rectifier bridge supplies the fields 511 and 512 and also the coil of the delay relay 519.

If the voltage drops or fails during translation, the under voltage relay 532 will drop out both the contacts 533 of Fig. 18a and the contact 550 of Fig. 18b, which will prevent printing so that a wrong recording will not be obtained in case of interruption of voltage or in case the Selsyn motors are out of synchronism.

The under voltage relay 532 with its contacts 533 and 550 will also prevent any printing until there is a re-check of the synchronism of the Selsyn motors with their armatures 504 and 505.

On the line 551 there is located the re-set button 552, the contact 553 of the quarter-second delay relay 519 and the white indicating light 554. The white light 554 will go out when there is a loss of voltage or power failure, and when it is lit up, it indicates that the device is ready to print.

Connected to the re-set button switch and the relay contact is the line 555 which is connected to the central contact 556 of the setting hand 557 of the unit weight switch R. The setting hand 557 may be placed on contacts 558, 559, 560, 561 and 562, which correspond to the contacts 563, 564, 565, 566 and 567 on the drop weight operator, leading to the line 568 to the double coils 778 of drop weight motor armature 777, having the condenser 779 in one of the circuits thereof and connected in parallel with the brake 522. The arm or hand 557 will determine the position at which the drop weight motor 777 stops, and the number of drop weights applied to bring the scale pointer back into scale range.

Switches 569 and 573 are respectively upper and lower limit switches.

To indicate the need for adjusting the unit weight switch, the limit switch 569 will close across the contacts 570, which will energize a relay 571. This relay 571 will act upon the contacts 572 and 576. The lower limit switch 573 when closed will energize the relay 574 having the contacts 575 and 577. The amber light 775 indicating up-off-scale is controlled by contact 572, while the red down-off-scale light 776 is controlled by contact 575. The contact 578 is also operated by the relay 517 of Fig. 18a, and prevents operation of relays 571 and 574 during translation.

The Selsyn armatures as shown at 504 and 505 in Fig. 18a have a three-wire system 579 with the synchronizing switch 580 (see Fig. 18a).

The main 115 volt A. C. source, as indicated at 581, supplies the main lines 582 and 583 past the fuses 584 and 585 (see Fig. 18b).

In operation, the 115 volt source across the lines 582 and 583 will be stepped up to 1800 volts by the transformer 458—456—457 and this high voltage will be supplied to the sectors 385 and cause a spark to the electrodes 374.

The circuit will terminate at the ground 586 (see Fig. 18a).

If the back of the casing of the weighing scale is off, the switch 482 will open the circuit so that there will not be a high voltage during inspection or repair. On the other hand, the time delay relay contact 484 will assure that the thyratrons will heat up before operation. When a weighing is being made upon the scale and there is a circuit by means of a spark from the arcuate sectors 385 to electrode 374, plate current will be transmitted to the armatures of the scale motor 500 and the print motor 501, assuring translation, with the Selsyn armatures 504 and 505 maintaining synchronism. During this period of translation, the printing motor armature 507 will not rotate in view of the fact that the contact arm 534 of the print motor micro-switch Y will be in the righthand position, as shown in Fig. 18a.

As soon as the translation has been completed, the switch arm 534 will be thrown to the contact 536 if weigh and print button has been previously depressed and the printing motor will be actuated to operate the cam shaft 113 and assure the cycle of operations, resulting in printing of the indication upon the scale.

The combination of the auxiliary delay relay 517 and the quarter-second delay relay 519 will assure that the printing will not take place, and that the cam shaft 113 will not operate when the motor armatures 500 and 501 are being operated.

When it is desired to print, the button 525 is pressed down, resulting in operation of the printer after stoppage of translation.

If there is any break in the line or an under voltage or an interruption of the supply of electrical energy, the relay 532 will open the contacts 533 and 550 and the device then cannot be started without re-setting the synchronism through the switch 580.

The relay 571 (see Fig. 18b) operates when the weighing machine is off scale on the upside. It actuates the contact 572 which controls and lights the amber light 575 indicating requirement for adding unit weights by unit weight switch R. The red light 776 is operated by the relay 574 when the weighing machine is off scale on the low side and this indicates that unit weights should be removed by the switch R. The relay 574 controls the contacts 575 and 577. The contact 575 lights the red light 776.

The contacts 576 and 577 are in the circuit with the coil of the relay 519 and prevent printing until correct number of unit weights are applied.

The rotating contact arm 557 of the unit weight switch R as shown at the right of Fig. 18b will cause the tare mechanism 673 of the weighing mechanism to add or subtract unit weights in accordance with the amber and red light indications 775 and 776 controlled by the relays 571 and 574.

In the unit weight system, there is provided a motor operated means 777 in the tare box 673 of the scale of Fig. 14 for adding or subtracting unit weights to the tare beam to change the range of the scale or to cause any weight being measured which falls above or below scale range to be brought back into scale range.

The relays 571 and 574 operate when the pointer of the weighing mechanism of Fig. 14 is off scale in an up direction or off scale in a down direction respectively.

The arm 557 will normally be on a contact point such as 558 after the motor 777 has been operated and the arm 557 has been rotated to the contact 558 on the open circuit at switch 563. The motor 777 having the double winding 778 with the condenser connection 779 will in this case be inactive. As soon as the arm 557 is moved by the knob 650 (Fig. 1) or 676 (Fig. 12) of the unit weight switch R to add or subtract unit weights and to a contact point 559, 560, 561 or 562 which is placed on a closed circuit by any of the switches 564, 565, 566 or 567, the motor 777 will commence operation, adding or subtracting unit weights to or from the tare mechanism 673 until a cam, which successively opens the switches 563 and 567, opens the circuit between conductors 555 and 568.

This will result in stopping the motor 777 when the proper unit weight or weights have been added to or removed from the tare mechanism.

It is by this unit weight mechanism that the thousands shaft T is coordinated with the units, tens and hundreds shafts A, F and K, respectively. The adding or subtracting of unit weights by the unit weight switch R will result in changing the stepped cams U or $U^2$ to the next unit, two thousand or five thousand as the case may be. This will be coordinated with the movement of the vernier cam CC of the 2000 x 2 arrangement of Figs. 1A and 1B and the vernier cam N² of the 5000 x 5 arrangement of Figs. 12 to 13A.

The vernier cam CC of Figs. 1 to 7 has only two positions, either on top of the boss 657 or in the recess 656 (see Figs. 3A and 3B). The position of the stepped wheel U will be determined by the gearing 94 and 95 of Figs. 1 and 1A from the unit weight switch knob 650, and it will also be affected by the pin 190. Either it will not move when the pin 190 contacts the top of the boss 657 or it will advance one thousand, or one step, when the pin 190 drops into the recess 656. This is done through the two to one ratio of differential DD.

The vernier cam N² of Figs. 13 and 13A has ten positions, 5 steps being provided on each side. The stepped cam U² will be actuated by the pin on the lever S² acting through the differential Q² and also through the gearing 679—685.

In these arrangements, the adjustment of the thousands stepped cams U and U² therefore is not by direct gearing connection to the hundreds shaft K, K¹ or K² but is by coordination with the unit weight switch R and the movement of the vernier lever and vernier cam on the next preceding a hundreds shaft.

The switch arm 557 and contacts 558 to 562 are located adjacent or in the printer of Figs. 1 to 7, while the contacts 563 to 567 will be in the tare compartment 673 of the scale mechanism of Fig. 14. The motor trip 777 is an A. C. induction two phase motor of the condenser type. A brake is provided to prevent coasting of the rotor. The motor 777 is also located in the tare compartment 673.

The contact 578 prevents jiggling of the relays 571 and 574 and flashing of lights 775 and 776 while the scale pointer is off-scale.

In operation the pointer shaft 354 will normally move upscale upon increasing weight and downscale upon decreasing weight and the follow up mechanism will move in same direction provided increments or decrements are slow.

However, if scale pointer and attached rear electrode of Figs. 16 and 17 move rapidly beyond half scale from zero, the spark will jump into reverse section and cause follow up ring 385 to arrive at the point of position by reverse motion.

This causes printer to register correct weight by subtractive instead of additive counting.

However, correct result is obtained because in any scale range, for example, the 5000 x 5 cam wheel representing the 1000's place will have but 5 steps and arriving at a reading by subtraction will nevertheless result in a correct reading. This will permit the follow up mechanism to approach null in the direction requiring least movement and its results in important saving in time. Because of subtraction beyond half scale position the last wheel U² of the 5000 x 5 arrangement of Fig. 13 must correspond to scale range and have 5 positions for 5000 x 5.

Between the last two shafts K and T of the 2000 x 2 arrangement of Figs. 7B and 7C and the last two shafts K² and 686 of the 5000 x 5 arrangement of Fig. 12, it will be noted that there is not a direct gearing connection but the coordination between these shafts is accomplished by means of a step cam arrangement CC of Fig. 1B or N² of Fig. 13A, a lever arrangement BB of Fig. 1B and S² of Fig. 13, a differential arrangement DD of Fig. 1A and Q² of Fig. 12 together with the gearing actuated by the unit weight switch handles 650 and 676. This is necessary since the scale range will usually be 1000, 2000, 5000 or of that general order and the additional subtraction of units in the thousands position must be done in coordination with the unit weight arrangement.

A regulated transformer in the wiring arrangement of Fig. 18a and 18b will maintain substantially constant voltage between the rings 385 and the electrode 374 regardless of the line voltage fluctuations. This is important to insure constancy of operating relationship between electrode 374 and rings 385.

At platen 277 in Fig. 6, it is also possible to use a strip recorder which will move paper or tape forwardly after each printing, movement being regulated by a spacer to give a single spacer interval or a double spacer interval or even a larger spacer interval.

In the printer, it is also possible to use an identifier consisting of 1 to 10 wheels which will print simultaneously with the weight, an indication of the source or identity of the material being weighed so that the recording will identify not only the weight but also the object or material being weighed.

Limit devices may also be provided to give warning to operator at printer when he cannot see the scale to advise him when the weight being measured is above or below scale range by appropriate colored signal lights. He will then be advised whether to add or subtract unit weights at the remote control unit weight switch.

Although described in connection with a weighing mechanism, the present recording and printing mechanism may be used with the recording and printing of the readings or indications obtained from operations of calculators, testing machines, adding machines, potentiometers, strain gages, flow gages, pressure gages, revolution counters and many other types of mechanisms, and it may also be directly driven without interposition of a servo-mechanism.

Having now particularly described and ascertained the nature of the invention, and in what manner the same is to be performed, what is claimed is:

1. In a vernier and sensing cam combination to be used in an indicator and printer to be used for indicating and printing the weight registered by an associated weighing machine, the indication of weight recorded being transmitted to said printer during the weighing operation and before the weighing machine reaches a balance and the printer being adjusted immediately after balance is reached correctly to read or indicate the weight, said adjusting mechanism including a plurality of digit wheels arranged to rotate relative to one another in fixed speed relationship during translation, vernier cam adjusting means to re-adjust angular position of each of said wheels after stoppage of translation to the correct full integer value representing the count, said adjusting means including a plurality of sequentially operated units, tens, hundreds and thousands vernier cams and connecting levers and gears to move said digit wheels to corrected position actuated by said vernier cams.

2. In a vernier and sensing cam combination to be used in an indicator and printer to be used for indicating and printing the weight registered by an associated weighing machine, the indication of weight recorded being transmitted to said printer during the weighing operation and before the weighing machine reaches a balance and the printer being adjusted immediately after balance is reached correctly to read or indicate the weight, said adjusting mechanism including a plurality of cam wheels arranged to rotate relative to one another in a fixed speed relationship during translation, vernier cam adjusting means to re-adjust angular position of each of said cams, after stoppage of translation, to the correct full integer value representing the count, said adjusting means including a plurality of sequentially operated units, tens, hundreds and thousands vernier cams and connecting levers and gears to move said digit wheels to corrected position actuated by said vernier cams.

3. In a vernier and sensing cam combination to be used in an indicator and printer to be used for indicating and printing the weight registered by an associated weighing machine, the indication of weight recorded being transmitted to said printer during the weighing operation and before the weighing machine reaches a balance and the printer being adjusted immediately after balance is reached correctly to read or indicate the weight, said adjusting mechanism including a plurality of cam wheels arranged to rotate relative to one another in a fixed speed relationship in correspondence with the operation of the weighing machine, vernier cam adjusting means to readjust angular position of each of said cams, after stoppage of count, to the correct full integer value representing the count, said adjusting means including a plurality of sequentially operated units, tens, hundreds and thousands vernier cams and connecting levers and gears to move said digit wheels to corrected position actuated by said vernier cams.

4. In a recording mechanism for a remote weighing mechanism, a plurality of shafts positioned in a parallel side by side relationship, said shafts repectively corresponding to units, tens and hundreds, said shafts having a direct ten to one gearing connection with each higher order shaft, a recording wheel on each of said shafts and vernier cam adjusting means to adjust said recording wheels after translation from said remote mechanism has ceased.

5. In a recording mechanism for a remote weighing mechanism, a plurality of shafts positioned in a parallel side by side relationship, said shafts respectively corresponding to units, tens and hundreds, said shafts having a direct ten to one gearing connection with each higher order shaft, a recording wheel on each of said shafts and vernier cam adjusting means to adjust said recording wheels after translation from said remote mechanism has ceased, said means including a differential gearing arrangement on the tens and hundreds shafts to permit reverse rotation of said last mentioned shafts to correct for overdrive without actuation of the ten to one gearing connection.

6. In a recording mechanism for a remote weighing mechanism, a plurality of shafts positioned in a parallel side by side relationship, said shafts respectively corresponding to units, tens and hundreds, said shafts having a direct ten to one gearing connection with each higher order shaft, a recording wheel on each of said shafts and vernier cam adjusting means to re-adjust said recording wheels after translation from said remote mechanism has ceased, said means including vernier cams on said units and tens shafts and vernier arms on the next higher order shafts to cause reverse motion thereof following translation.

7. In a recording mechanism for a remote weighing mechanism, a plurality of shafts positioned in a parallel side by side relationship, said shafts respectively corresponding to units, tens and hundreds, said shafts having a direct ten to one gearing connection with each higher order shaft, a recording wheel on each of said shafts and vernier cam adjusting means to readjust said recording wheels after translation from said remote mechanism has ceased.

8. In a recording mechanism for a remote weighing mechanism, a plurality of shafts positioned in a parallel side by side relationship, said shafts respectively corresponding to units, tens and hundreds, said shafts having a direct ten to one gearing connection with each higher order shaft, a recording wheel on each of said shafts and vernier cam adjusting means to readjust said recording wheels after translation from said remote mechanism has ceased, and a printing mechanism having a plurality of type wheels positioned in side by side relationship and set by said recording wheels.

9. In a recording mechanism, a plurality of shafts positioned in a parallel side by side relationship, said shafts respectively corresponding to units, tens and hundreds, said shafts having a direct ten to one gearing connection with each higher order shaft, a preliminary representation wheel on each of said shafts and means to readjust said preliminary representation wheels after translation from said remote mechanism has ceased, and a printing mechanism having a plurality of type wheels positioned in side by side relationship and set by said preliminary representation wheels, said recording wheels being stepped and having one step for each digit in said type wheels and setting levers to contact the appropriate steps of each preliminary representation wheel to set the corresponding type wheel to the appropriate digit to be printed.

10. In a setting and recording mechanism, a plurality of counters corresponding to units, tens, hundreds and thousands, a gearing train driving the counters from one another in a predetermined ratio and readjusting means to correct for overdrive, said adjusting means including units, tens, hundreds and thousands vernier cams, said vernier cams being driven by said gearing, levers to contact said vernier cams and differential gearing actuated by said levers to achieve an opposite drive from that of the gearing whereby a reverse adjustment is obtained and means to drive said levers to contact said vernier cams.

11. In a printing mechanism, a plurality of type printing wheels arranged side by side to print units, tens, hundreds and thousands, a plurality of stepped wheels one for each type wheel, a gearing arrangement to drive said stepped wheels in a ten to one ratio in respect to each other and an adjusting means to adjust said stepped wheels to correct for overdrive, said adjusting means including units, tens, hundreds and thousands vernier cams, said vernier cams being driven by said gearing, levers to contact said vernier cams and differential gearing actuated by said levers to achieve an opposite drive from that of the gearing whereby a reverse adjustment is obtained and means to drive said levers to contact said vernier cams.

12. In an indicating mechanism of the type including a weighing mechanism serving as a source of measurement, an indicator mechanism, a translation means between the source and the indicator mechanism, said indicator including a plurality of movable members to indicate a series of characters which will correspond to the measurement at the source, means to actuate said movable indicating members to place said characters in proper relative position for such indication and means operative after completion of operation of said translation, vernier cam adjusting means to correctly adjust said movable indicating members to correct position in respect to each other in accordance with the measurement, said adjusting means including a plurality of sequentially operated vernier cams and connecting levers and gears to correct said adjustment.

13. In a printing mechanism, a plurality of printing wheels to give an indication of a number consisting of a plurality of digits to indicate a measurement, means to adjust said printing wheels to correctly print said measurement, said means including a plurality of adjusting devices to approximately adjust said digits to correspond to said measurement and a plurality of vernier devices to readjust the initial adjustment after said approximate adjustment, said adjusting means including a differential gear drive to give such readjustment, and a plurality of levers to actuate said differential gear drive operated in sequence.

14. In a printer mechanism of the type actuated by measurement at a remote source, a plurality of stepped wheels, each of which is stepped to correspond to whole number in a different place of digits, a gearing arrangement to drive said stepped wheels to give an approximate adjustment corresponding to the measurement at the remote source, and an adjustment means to readjust said stepped wheels after said gearing has completed driving said stepped wheels to said approximate adjustment, to give the exact adjustment, said adjusting means including a differential gear drive to give such readjustment, and a plurality of levers to actuate said differential gear drive operated in sequence.

15. In a printing mechanism having a plurality of separate type wheels positioned in side-by-side relationship corresponding to units, tens and hundreds, a plurality of units, tens and hundreds drive shafts driven from a direct motor-selsyn arrangement and actuated by a weighing machine, each drive shaft carrying a stepped cam, the steps of which will set the corresponding type wheels, and an adjustment therefor including units, tens, hundreds and thousands vernier cams, levers to contact said vernier cams and differential gearing actuated by said levers to achieve a reverse drive.

16. In an indicator or printer to be used for indicating or printing the weight registered by an associated weighing machine, the indication of weight recorded being transmitted to said printer during the weighing operation and before the weighing machine reaches a balance and the printer being adjusted immediately after balance is reached correctly to read or indicate the weight, said adjusting mechanism including a plurality of shafts directly geared to and driven in sequence from one another, a stepped cam on each shaft, a vernier cam on each shaft, differential gearing on each shaft, and levers operated in the driving sequence from the vernier cam of each shaft in succession during adjustment and acting through the differential gearing to adjust the stepped and vernier cams on the next shaft.

17. A control for a recording mechanism comprising a gear train having a succession of meshing gears respectively to drive units, tens, hundreds and thousands shafts, stepped cams positioned on and driven by each of said shafts, differential gearing positioned on each of said shafts between the gears and the stepped cams, levers to drive said differential gearing to cause reverse movement of the stepped cams after being driven by said gear train, vernier cams stopping and thus controlling the movement of said levers, and setting bars also stopped and controlled by said stepped cams for controlling the recording mechanism.

18. The mechanism of claim 17, said levers being provided with springs to bias them against said vernier cams and said setting bars also being provided with springs to bias said setting bars toward and against said stepped cams.

19. In a setting control for a recording mechanism a plurality of spring-biased setting bars, a plurality of units, tens, hundreds and thousands stepped cams to control the position of said setting bars, a plurality of vernier cams actuated to move with said stepped cams to adjust the position of said stepped cams and differential gearing and a gearing train successively to move and adjust the positions of each of said stepped and vernier cams.

20. In a control for a recording mechanism, a plurality of stepped cams, a plurality of units, tens, hundreds and thousands stepped cams to control the recording, a gearing train to drive said stepped cams to initial position and differential gearing to cause a reverse movement of each of said stepped cams to an adjusted position, and a lever and vernier cam arrangement to drive said differential gearing from the motion of each preceding stepped cam.

21. In a control for a printer having a plurality of printing wheels, a plurality of setting bars to set such wheels, a plurality of cams to stop and control the setting of said bars, a plurality of shafts to rotate and fix the position of said stepped cams, a plurality of differential gears positioned on said shafts and a plurality of levers to actuate said differential gears to adjust the positions of said stepped cams.

References Cited in the file of this patent

UNITED STATES PATENTS

| | | |
|---|---|---|
| 838,128 | Mays | Dec. 11, 1906 |
| 1,127,061 | Mays | Feb. 2, 1915 |
| 1,190,377 | Church | July 11, 1916 |
| 1,246,087 | Gooch | Nov. 13, 1917 |
| 1,502,360 | Tolle | July 22, 1924 |
| 1,655,244 | Rowell | Jan. 3, 1928 |
| 1,677,835 | Linderman | July 17, 1928 |
| 1,913,983 | Gardner | June 13, 1933 |
| 2,344,627 | Mixer | Mar. 21, 1944 |
| 2,393,186 | Potter | Jan. 15, 1946 |
| 2,496,585 | Harper | Feb. 7, 1950 |
| 2,529,747 | Toorell | Nov. 14, 1950 |
| 2,558,631 | Suter | June 26, 1951 |

FOREIGN PATENTS

| | | |
|---|---|---|
| 498,310 | Germany | May 21, 1930 |
| 217,539 | Switzerland | June 16, 1942 |